(12) United States Patent
Church et al.

(10) Patent No.: US 12,012,843 B2
(45) Date of Patent: Jun. 18, 2024

(54) DOWNHOLE TOOL

(71) Applicant: KASEUM HOLDINGS LIMITED, Aberdeen (GB)

(72) Inventors: Paul Andrew Church, Aberdeen (GB); Peter Alan Joiner, Aberdeen (GB); Andrew John Elrick, Peterhead (GB); Iain Morrison Macleod, Newmachar (GB)

(73) Assignee: KASEUM HOLDINGS LIMITED, Aberdeen (GB)

( * ) Notice: Subject to any disclaimer, the term of this patent is extended or adjusted under 35 U.S.C. 154(b) by 939 days.

(21) Appl. No.: 17/040,175

(22) PCT Filed: Mar. 22, 2019

(86) PCT No.: PCT/GB2019/050832
§ 371 (c)(1),
(2) Date: Sep. 22, 2020

(87) PCT Pub. No.: WO2019/180462
PCT Pub. Date: Sep. 26, 2019

(65) Prior Publication Data
US 2021/0123325 A1    Apr. 29, 2021

(30) Foreign Application Priority Data
Mar. 23, 2018 (GB) ..................... 1804719

(51) Int. Cl.
*E21B 17/02* (2006.01)
*E21B 41/00* (2006.01)
(Continued)

(52) U.S. Cl.
CPC ............ *E21B 47/01* (2013.01); *E21B 17/028* (2013.01); *E21B 41/00* (2013.01); *H02K 5/24* (2013.01);
(Continued)

(58) Field of Classification Search
CPC ............................... E21B 47/01; E21B 17/028
See application file for complete search history.

(56) References Cited

U.S. PATENT DOCUMENTS 3,892,274 A   7/1975   Dill
3,958,641 A   5/1976   Dill et al.
(Continued)

FOREIGN PATENT DOCUMENTS

AU   2003258066 A1   2/2004
CN   202170989 U     3/2012
(Continued)

OTHER PUBLICATIONS

Combined Search and Examination Report (GB 1904003.9), dated Sep. 23, 2019.
(Continued)

*Primary Examiner* — Sunil Singh
(74) *Attorney, Agent, or Firm* — Hunton Andrews Kurth LLP

(57) ABSTRACT

A downhole tool (1) comprises a power control module (20), which includes a battery pack (22) for supplying power to components of the tool, and an electronic control circuit (24) for controlling the supply of power by the battery pack. The electronic control circuit (24) and battery pack (22) are contained within a housing (26) that allows their insertion and removal as a single unit. The tool (1) also comprises an electric motor (104) for powering a gear assembly (210), and a braking system comprising an electrical and a magnetic brake for braking the motor (104) when required. The gear assembly (210) comprises two or more stages (222, 232, 242, 252, 262), each having a sun gear (223, 233, 243, 253, 263) with a respective diameter, and each sun gear 223, 233, 243, 253, 263 having a raised convex dimple (223LD, 233UD, 233LD, 243UD) that is in constant touching contact with the adjacent sun gear's (223, 233, 243, 253, 263) raised
(Continued)

convex dimple (223LD, 233UD, 233LD, 243UD), allowing load experienced by the tool (1) to be transferred along a load path including the dimples (223LD, 233UD, 233LD, 243UD), reducing vibrations and shocks.

10 Claims, 10 Drawing Sheets

(51) Int. Cl.

| | | |
|---|---|---|
| *E21B 47/01* | (2012.01) | |
| *H02K 5/24* | (2006.01) | |
| *H02K 7/102* | (2006.01) | |
| *H02K 7/116* | (2006.01) | |
| *H02K 11/00* | (2016.01) | |
| *H02K 11/33* | (2016.01) | |
| *H02P 3/22* | (2006.01) | |

(52) U.S. Cl.
CPC ........... *H02K 7/1025* (2013.01); *H02K 7/116* (2013.01); *H02K 11/0094* (2013.01); *H02K 11/33* (2016.01); *H02P 3/22* (2013.01); *H02K 2211/03* (2013.01)

(56) References Cited

U.S. PATENT DOCUMENTS

| | | | |
|---|---|---|---|
| 4,441,557 | A | 4/1984 | Zublin |
| 5,323,797 | A | 6/1994 | Rankin |
| 5,517,464 | A | 5/1996 | Lerner et al. |
| 6,236,620 | B1 | 5/2001 | Schultz et al. |
| 6,397,864 | B1 | 6/2002 | Johnson |
| 7,513,261 | B2 | 4/2009 | Ura |
| 9,080,413 | B2 | 7/2015 | Winnon |
| 9,797,197 | B1 | 10/2017 | Eddy |
| 2005/0024989 | A1 | 2/2005 | Fling et al. |
| 2005/0279503 | A1 | 12/2005 | Wilson et al. |
| 2010/0258298 | A1 | 10/2010 | Lynde et al. |
| 2011/0162835 | A1 | 7/2011 | Gray |
| 2015/0107824 | A1 | 4/2015 | Signorelli et al. |
| 2015/0107852 | A1 | 4/2015 | Southgate et al. |
| 2015/0333377 | A1 | 11/2015 | Davila et al. |
| 2016/0115753 | A1 | 4/2016 | Frazier et al. |
| 2017/0145791 | A1 | 5/2017 | Purkis |
| 2017/0218745 | A1 | 8/2017 | Erdos et al. |
| 2017/0226848 | A1 | 8/2017 | Chatelet et al. |
| 2018/0340415 | A1 | 11/2018 | Chin et al. |

FOREIGN PATENT DOCUMENTS

| | | | | |
|---|---|---|---|---|
| CN | 110608242 A | | 12/2019 | |
| EP | 0613758 A1 | | 9/1994 | |
| EP | 2866956 | | 1/2014 | |
| GB | 2300441 A | * | 11/1996 | ............ E21B 23/06 |
| GB | 2574099 B | | 11/2019 | |
| WO | WO-2015073011 A1 | * | 5/2015 | ........... E21B 29/005 |

OTHER PUBLICATIONS

Further Search Report (GB 1904003.9), dated May 14, 2020.
Further Search Report (GB 1904003.9), dated May 13, 2020.
Further Search Report (GB 1904003.9), dated May 14, 2020 (second).
Machine translation of CN110608242A.
Machine translation of CN202170989U.
Excerpt from web site—Aqua Milling Pipetech, downloaed from http://www.pipetech.no/services/aquamilling/ (Dec. 13, 2016).
Excerpt from web site—Giant Group Services, downloaded from https://web.archive.org/web/20161018212336/http:/giantgroupme.com/hydromilling.php (Dec. 13, 2016).
Search Report (GB 1912761.2) dated Feb. 3, 2020.
Combined Search and Examination Report under Sections 17 and 18(3) dated Sep. 2019 issued in Great Britain Application No. GB1904003.9.
Certificate of Grant of Patent issued in GB 2574099 dated Apr. 14, 2021.
Intention to Grant under Section 18(4) dated Jan. 29, 2021 issued in Application No. GB1904003.9.

* cited by examiner

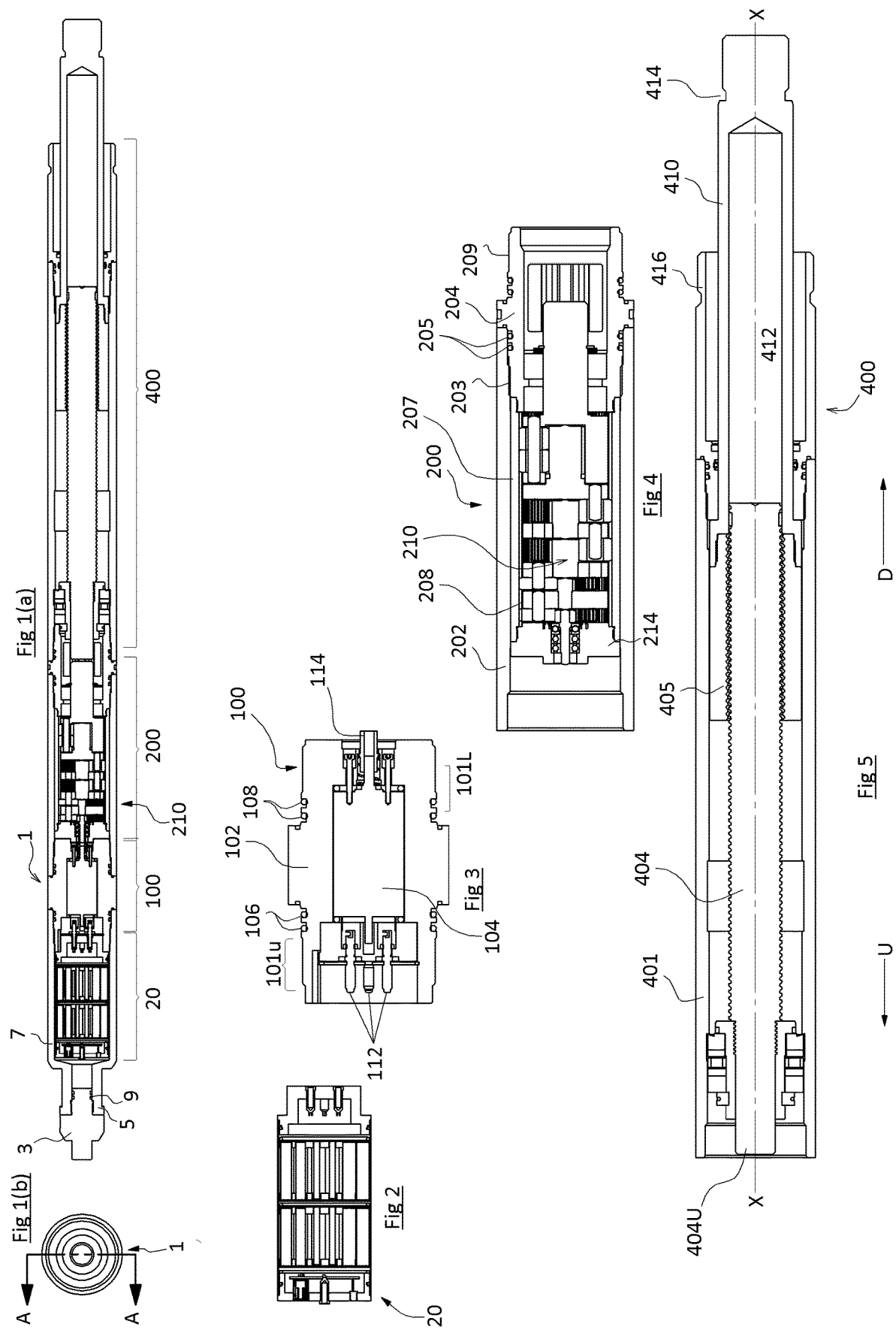

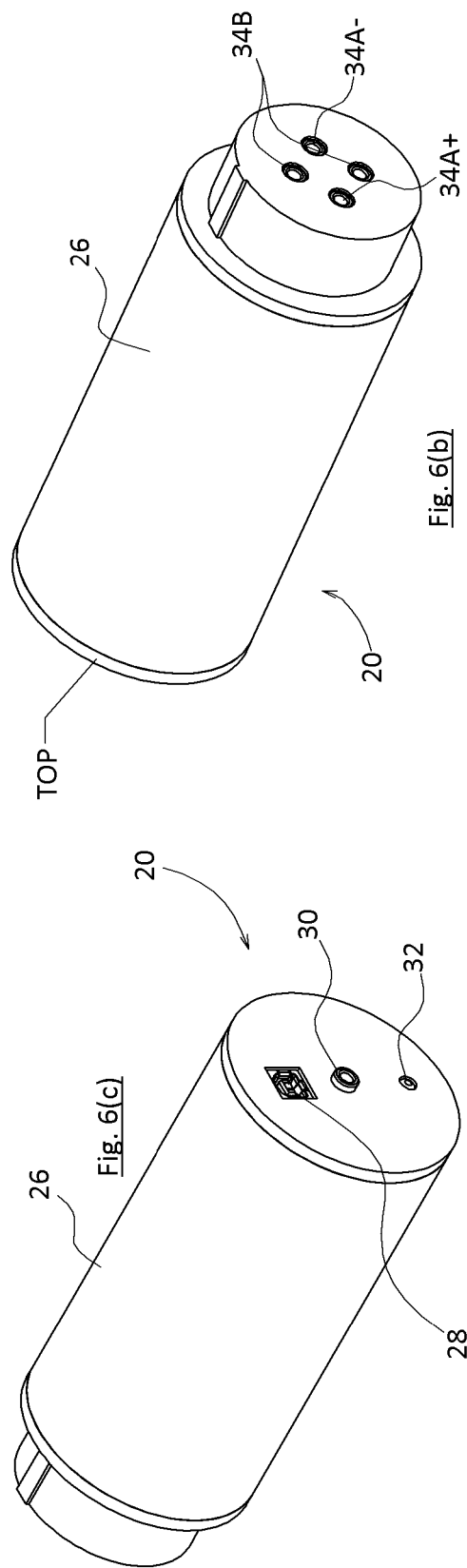
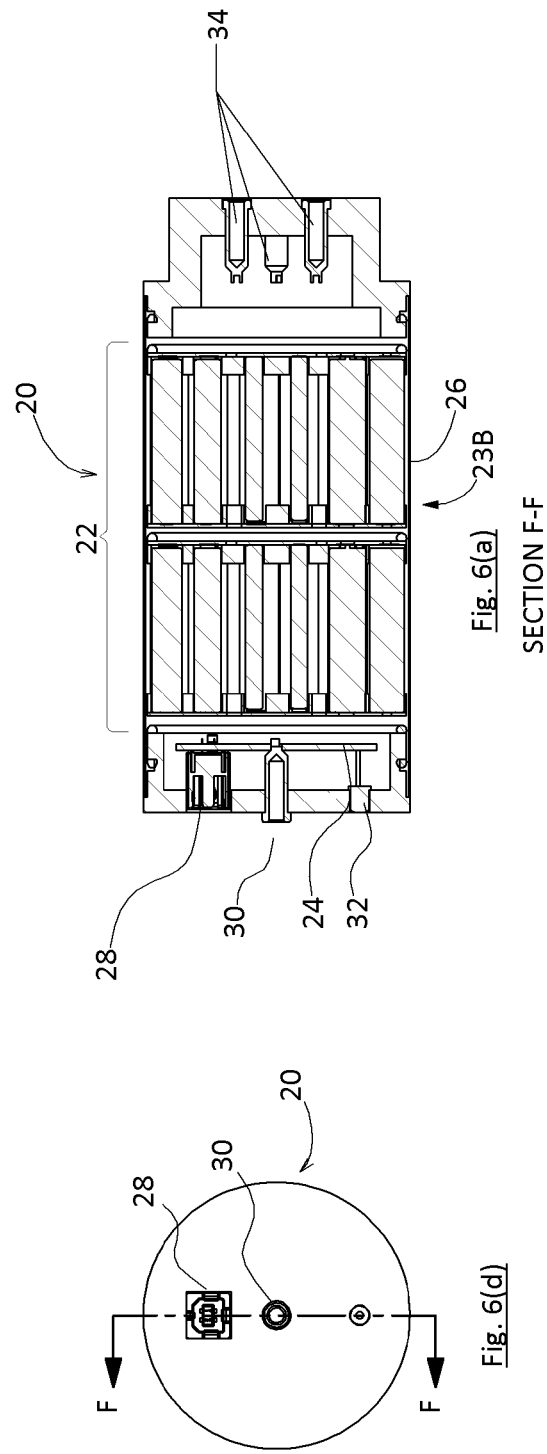

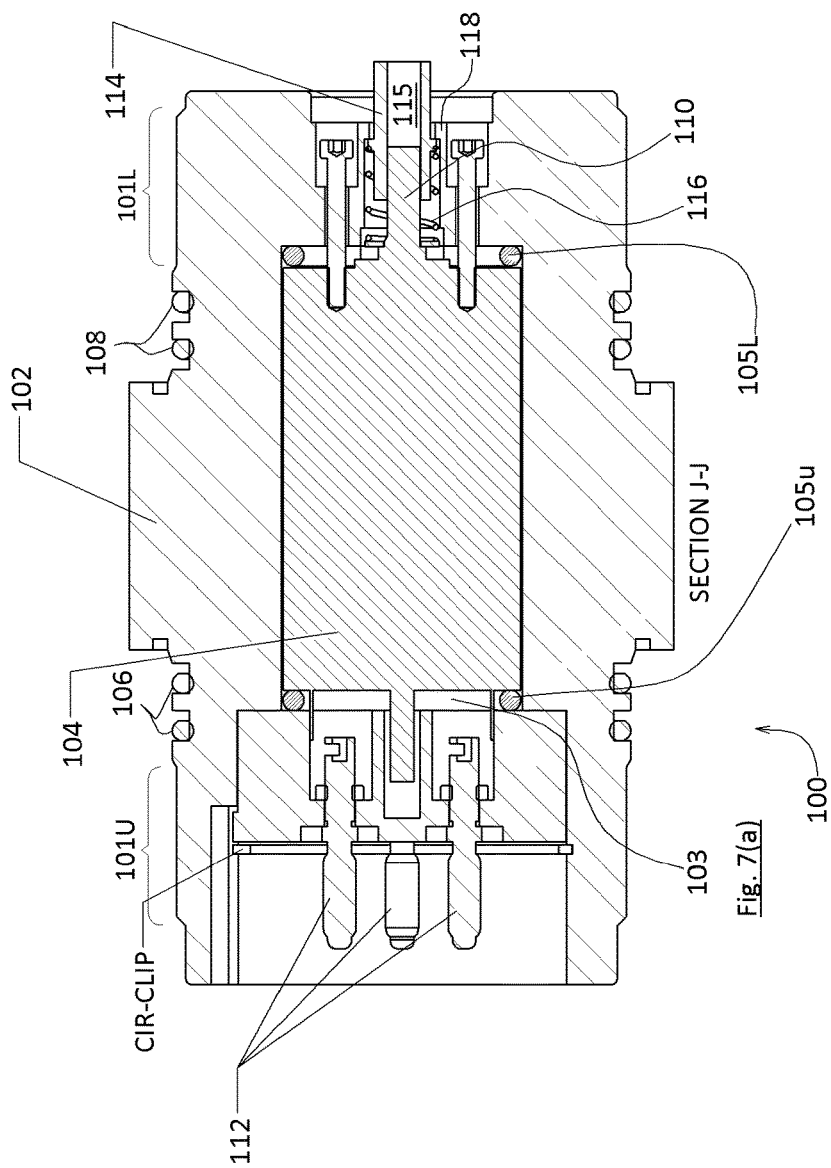
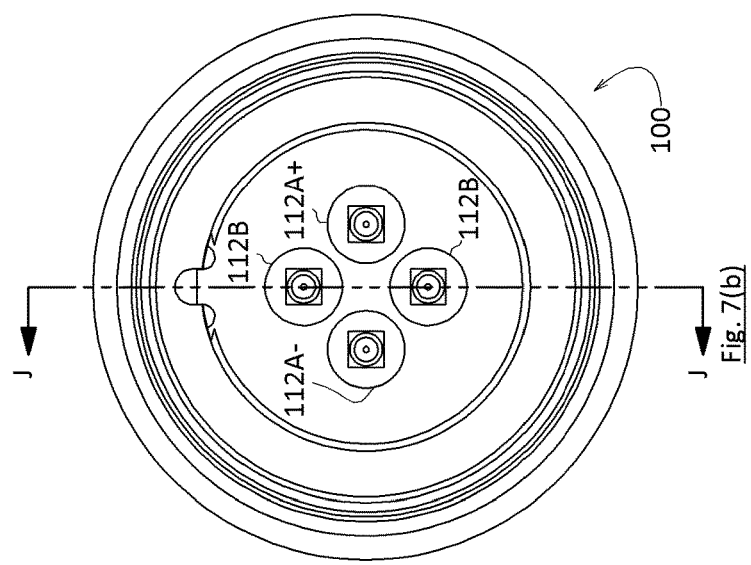

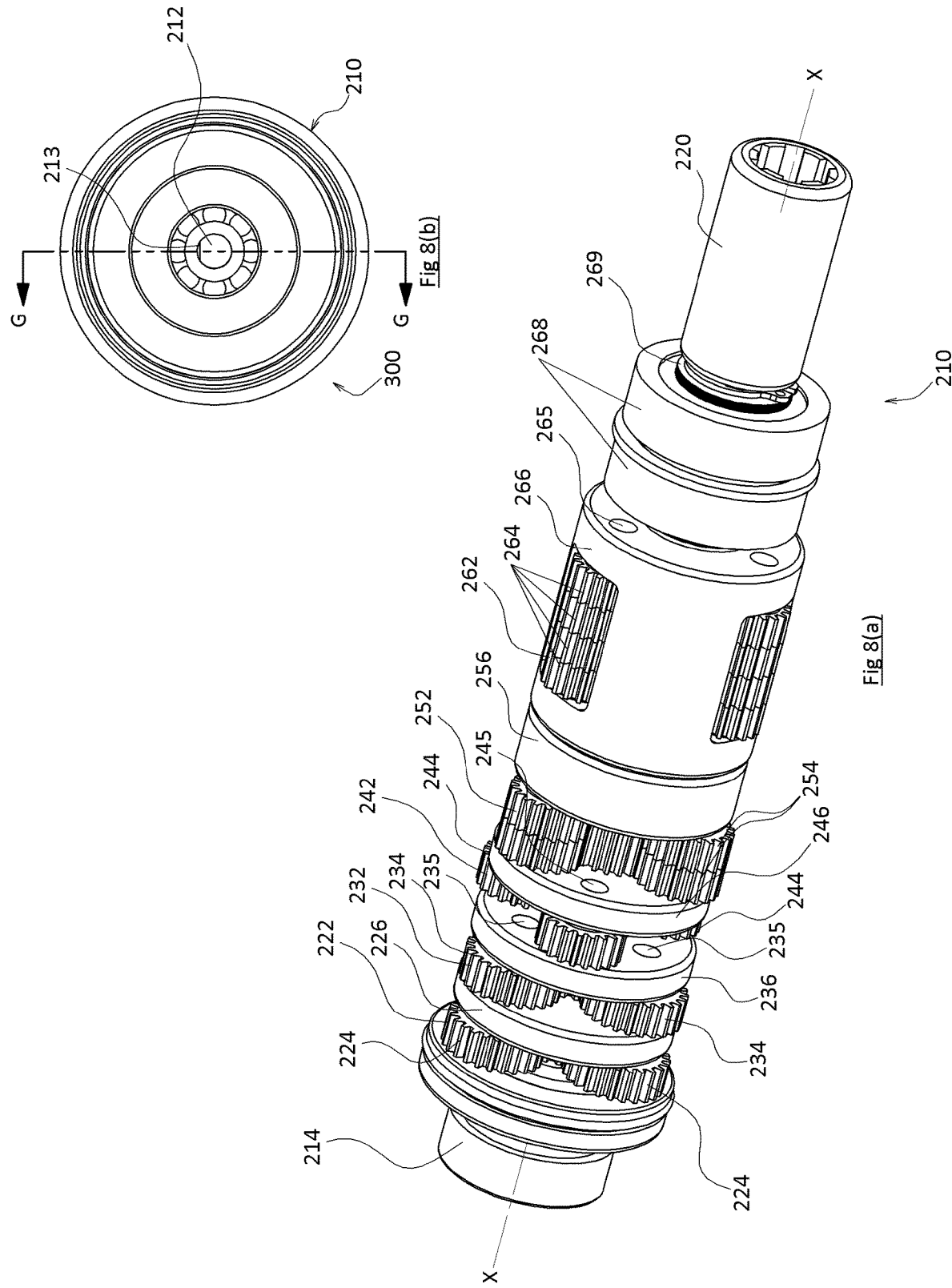

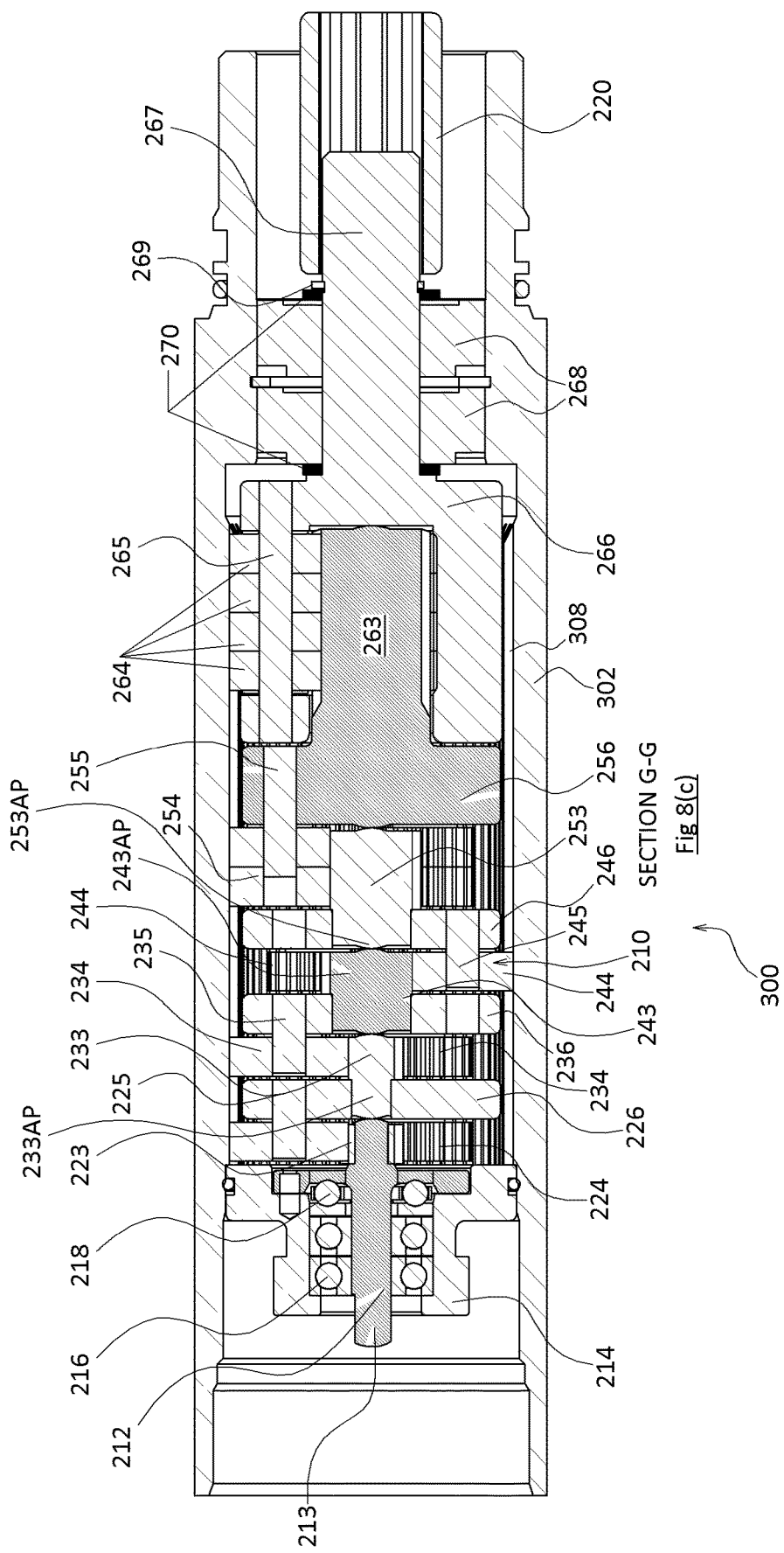

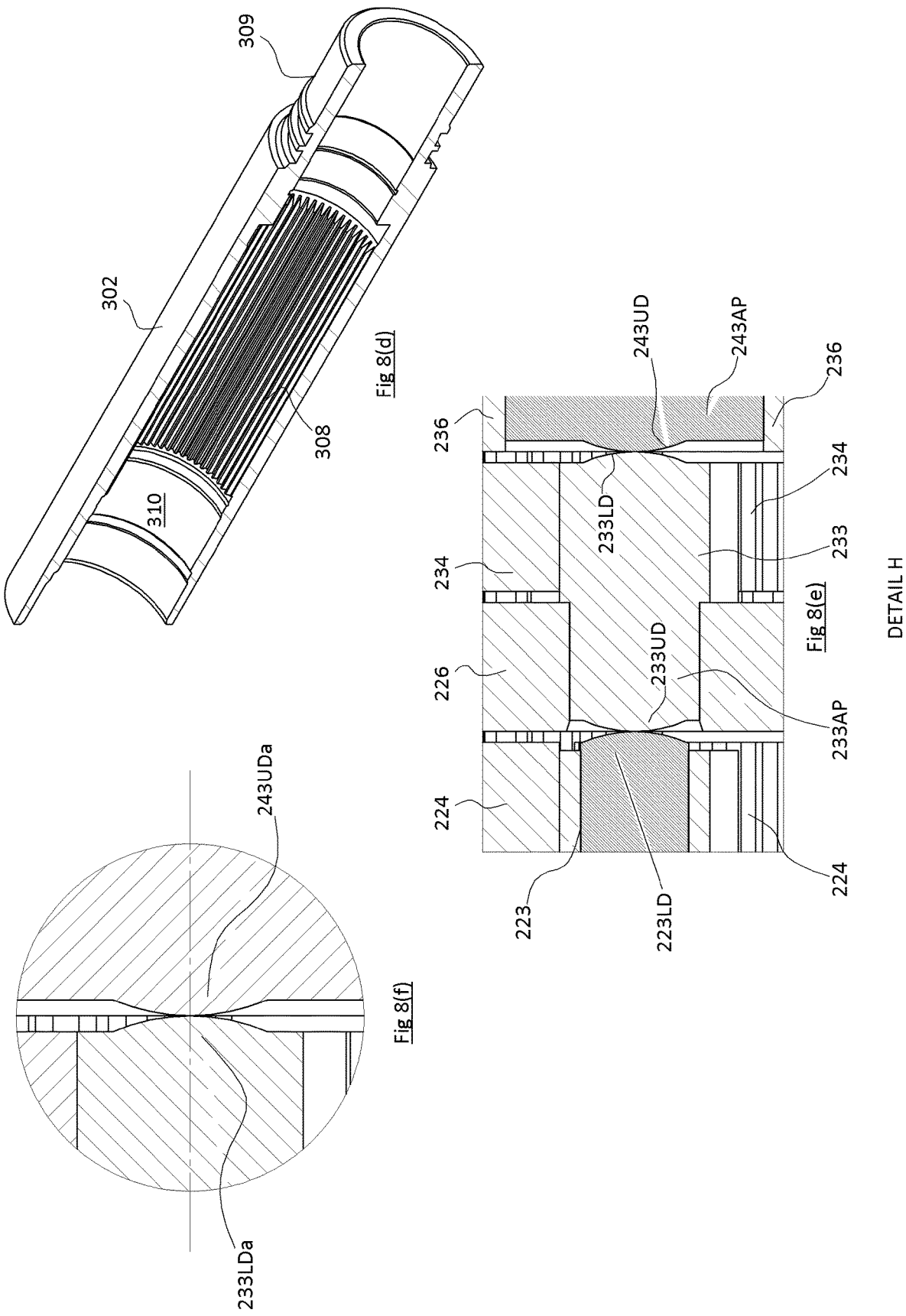

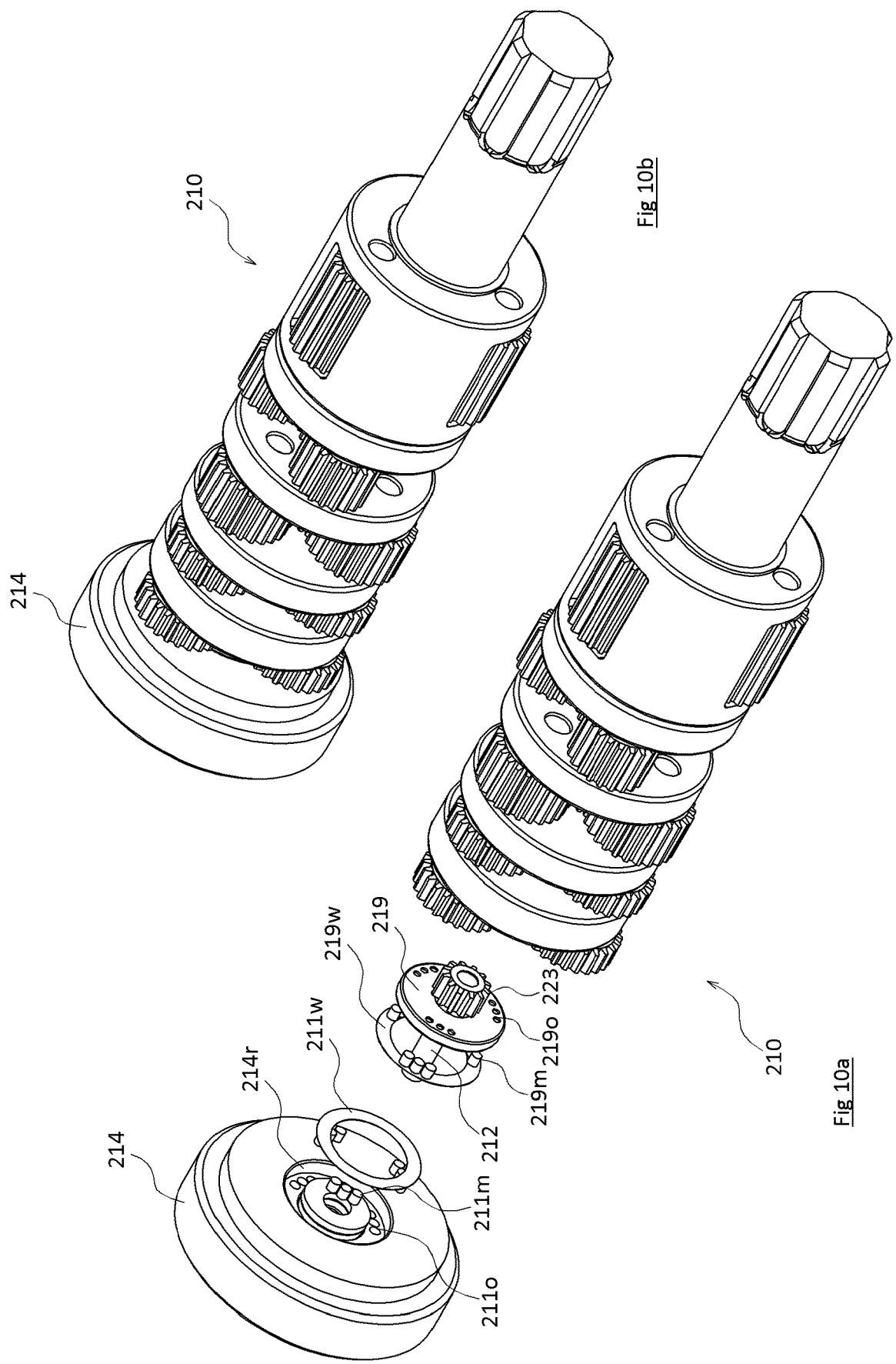

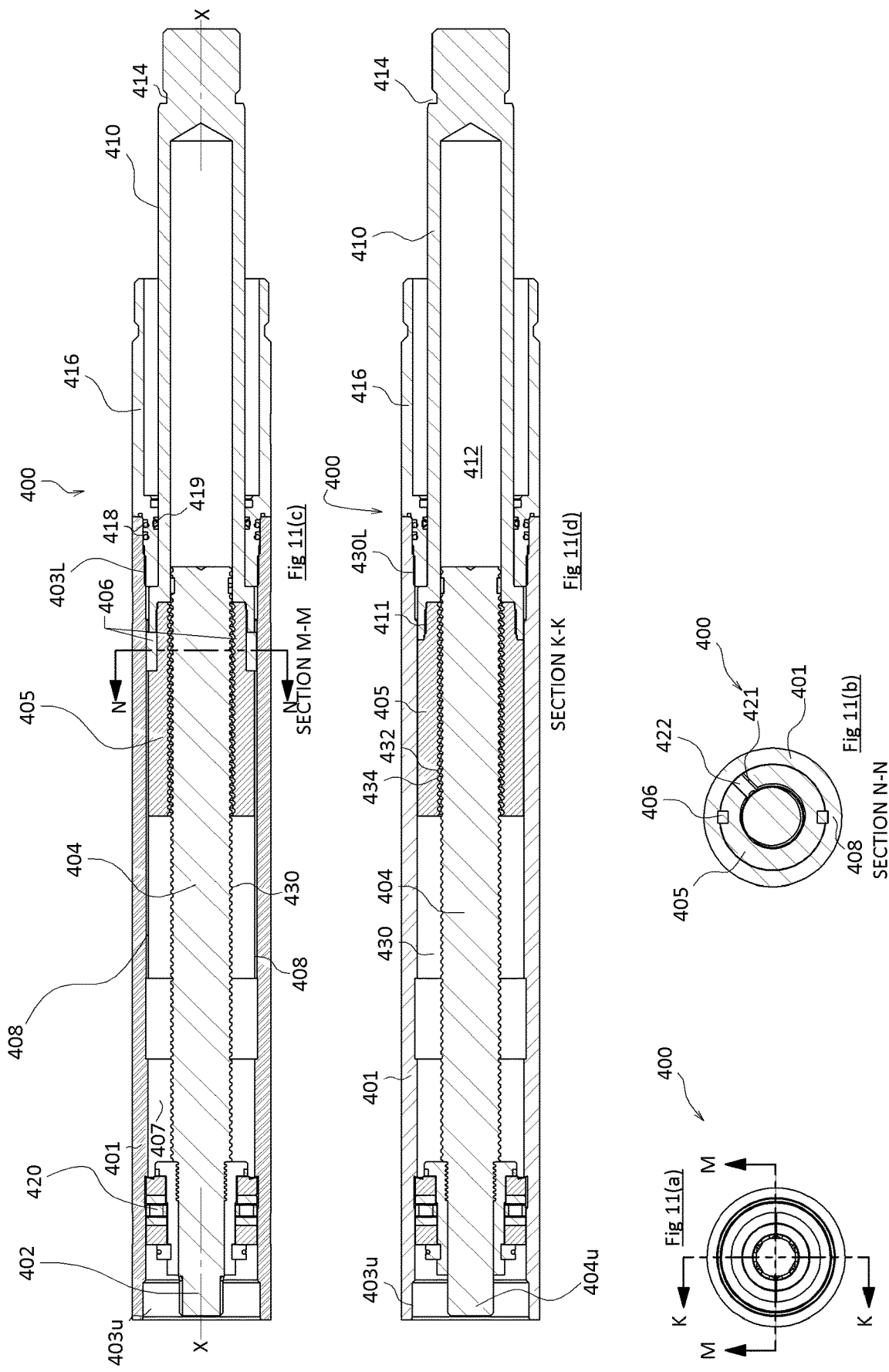

DOWNHOLE TOOL

The present invention relates to an apparatus and methods for generating an axial and/or rotational force downhole. More particularly, the present invention relates to a number of aspects that can be incorporated into a downhole tool which can be used to generate rotational output from a motor such as an electrical motor, and which can, in various embodiments, further then create a longitudinal or axially directed force by means of a lead screw or the like.

BACKGROUND OF THE INVENTION

In the exploration and/or exploitation of hydrocarbons such as oil and/or gas, it is often necessary to provide either a rotational torsion or movement downhole, and/or further provide an axial force downhole in order to operate or actuate additional downhole tools such as perforating guns, downhole valves, or sliding sleeves etc. This is typically achieved by using a downhole setting tool, one example of which is shown in U.S. Pat. No. 6,199,628 to Halliburton Energy Services, Inc.

Conventional downhole setting tools typically comprise an electrical motor coupled to a reduction gear box, where the electrical motor is typically powered from the surface via e-line. The output of the reduction gear box can either be used to, for example, rotate a valve between open and shut, or to provide a rotary output for a cutting or punching operation; or more typically is coupled to a lead screw arrangement in order to provide axial/longitudinal movement to force or move, for example, a sliding sleeve in a direction parallel to the longitudinal axis of the setting tool and therefore the wellbore. In more recent times, such setting tools are also extensively used in order to set plugs used in the process of hydraulic fracturing (aka "frac'ing") of wells.

Such conventional setting tools are, however, very costly and suffer from a number of disadvantages. In particular, the electrical motors in such conventional prior art setting tools are completely powered from surface and therefore are completely operated from surface. Hence, if anything goes wrong e.g. with the power being sent via the e-line from the surface, then it is not possible to operate such a conventional setting tool and a very expensive and time consuming retrieval trip is required to pull the e-line, setting tool, and the rest of the work string/Bottom Hole Assembly (BHA) out of the wellbore.

Additionally, conventional gear boxes used with such prior art setting tools are typically not able to cope with significant jarring events which may occur downhole, particularly if a BHA gets stuck.

It would also be beneficial to provide as compact a setting tool (in terms of its longitudinal length) as possible. More compact tools are desired by operators as they typically reduce the cost and time involved in the running in/pulling out of the wellbore.

Additionally, further improvements in terms of the performance of conventional setting tools and also in terms of reducing the costs of such conventional setting tools would be highly desirable, particularly given the need in the oil and gas industry to reduce costs wherever possible.

It is therefore a desirable object of embodiments of the present invention to provide one, more than one, or if possible as many of the above identified advantages as possible.

SUMMARY OF THE INVENTION

According to a first aspect of the present invention there is provided a power control module for use in a downhole tool, the power control module comprising:
 a housing;
 a battery pack; and
 an electronic control circuit for controlling operation of at least the battery pack; and
 a positive electric output terminal and a negative electric output terminal for supplying electric power from the battery pack to a respective positive electric input terminal and a respective negative electric input terminal provided in the downhole tool;
 wherein the power control module is mountable to the downhole tool such that the positive electric output terminal of the power control module is in electrical communication with the positive electric input terminal of the downhole tool and the negative electric output terminal of the power control module is in electrical communication with the negative electric input terminal of the downhole tool;
 and wherein the power control module is removable from the downhole tool such that the positive electric output terminal of the power control module is not in electrical communication with the positive electric input terminal of the downhole tool and the negative electric output terminal of the power control module is not in electrical communication with the negative electric input terminal of the downhole tool;
 characterised in that the power control module further comprises a switch, and wherein the switch is arranged:
 to open when the power control module is removed from the downhole tool such that the battery pack is isolated from the electronic control circuit to preserve charge in the battery pack; and is further arranged to close when the power control module is mounted to the downhole tool such that the battery pack is permitted to provide power to the electronic control circuit; and
 wherein the housing is configured to contain the battery pack and electronic control circuit such that the battery pack and electronic control circuit are mountable to and removable from the downhole tool as a single unit.

The first aspect of the present invention has the advantage that the electronic control circuit is capable of being automatically powered on when the power control module is mounted in the downhole tool and therefore preserves the battery pack until it is needed to be mounted within the downhole tool.

Preferably, the power control module is a disposable/recyclable component and can be readily replaced by a fresh/fully charged power control module once it has been used. Optionally the housing of the power control module is in the form of a cartridge, for example, optionally the electronic control circuit and battery pack are contained in a single housing that may optionally be installed in and removed from the downhole tool as a single unit. Alternatively, the electronic control circuit and battery pack may be in separate individual housings that are contained within a larger cartridge housing that is mountable to and removable from the downhole tool as a single unit, where the individual housings permit electrical connection/communication between the electronic control circuit and the battery pack. Optionally the electronic control circuit and the battery pack are physically connected, for example welded, soldered, or otherwise connected. Optionally the electronic control circuit cannot be separated from the battery pack without damage to one or both components.

The advantage offered by having both the battery pack and the electronic control circuit in a single unit that is removed/mounted as one component is that this reduces the risk of failure of the electronics within the control circuit. Electronics that are sealed within reusable tools, and are therefore not changed out regularly, are prone to suffer from cumulative shocks (for example from jarring events and the like) and are more likely to fail as a result. The containment of the electronic control circuit in a cartridge with the battery pack results in the operator being required to change the electronic control circuit as frequently as the batteries, i.e. between each operation, and therefore significantly enhances the safety and reliability of the tool overall.

Typically, the electronic control circuit requires power from the battery pack to operate, and further controls operation of the battery pack in supplying electrical power to the downhole tool. Optionally the power control module is run on e-line. Optionally the electronic control circuit is configured to receive data and/or signals via e-line or optionally via slick e-line from the surface. Optionally the data may comprise instructions for the electronic control circuit e.g. to switch on, operate the motor, and the like. The power control module is thus optionally run on e-line, or optionally slick e-line, but optionally uses the battery pack as its sole power source. The e-line is utilised as a means of optionally transmitting commands to the electronic control circuit, where the commands may be sent from the surface of the wellbore into which the downhole tool is run. Optionally signals such as data may be sent from downhole to surface on the e-line or optionally slick e-line.

An advantage of using the battery pack as the sole power source is that the tool may be operated whether on e-line or another type of line. Regardless of the conveyance method of the tool, the battery pack ensures that there is always a power source downhole. For example, optionally the tool may be controlled by a pre-programmed timing operation that instructs the motor to begin rotation, without necessarily requiring any signals to be sent from the surface.

Additionally, with prior art conventional downhole tools run in on e-line, a power convertor would be required in order to supply power to the motor and circuitry. However, by having the battery pack supplying power, the tool in accordance with the present invention will be able to operate regardless of power conversion status, optionally after having been commanded to do so by a low voltage signal being sent from the surface via the e-line.

Typically, the downhole tool further comprises an electrical motor and the electronic control circuit controls operation of the battery pack in selectively supplying electrical power to the electrical motor in order to selectively operate the electrical motor.

Preferably, the switch comprises closing an electrical circuit to permit electricity to flow from the battery pack to the electronic control circuit. Preferably, the switch comprises at least one electrical coupling between the power control module and the downhole tool. More preferably, the switch comprises two electrical couplings between the power control module and the downhole tool, wherein the switch preferably comprises two plugs provided on one of the power control module and the downhole tool and two sockets provided in the other of the power control module and the downhole tool, wherein the two plugs are arranged to engage with and make an electrical coupling with the two sockets when the power control module is mounted to the downhole tool, and the two plugs or the two sockets that are provided on the downhole tool are electrically coupled to one another such that they short circuit when the power control module is mounted to the downhole tool. Preferably, the two plugs are arranged to disengage from the respective two sockets when the power control module is removed from the downhole tool, such that the short circuit is removed and such that the battery pack is isolated from the electronic control circuit to preserve charge in the battery pack.

Typically, the switch is located in between, and is in electrical communication with, the battery pack and the electronic control circuit such that when the switch is closed, electricity flows from the battery pack to the electronic control circuit to power the electronic control circuit.

Alternatively, the switch may be provided in electrical communication with one of the positive or negative electric output terminals and further may comprise closing an electrical circuit to permit electricity to flow from the battery pack to the downhole tool.

The switch may be provided in a separate switch module removable from the power control module and/or the electrical motor. Typically, the switch module may comprise one or more additional switches such as (but not limited to) a mechanical pressure switch or a temperature switch.

Alternatively, the said switch may comprise one or more components of the electrical motor engaging with one or more components of the power control module (without the need for a separate switch module).

Typically, the electronic control circuit comprises a Printed Circuit Board (PCB) mounted within the power control module, preferably at or towards the upper end thereof in use. Alternatively, the PCB may be mounted within the power control module at or towards the lower end thereof in use particularly in order to provide a shorter length of power control module.

According to a second aspect of the present invention there is provided a braking system for resisting or permitting rotation of an electrical motor, wherein the braking system is for use in a downhole tool comprising the electrical motor;
  wherein the braking system comprises a power control module and magnetic brake, the power control module comprising:
  a housing;
  a battery pack; and
  an electronic control circuit for controlling operation of the battery pack;
  wherein the housing is configured to contain the battery pack and electronic control circuit such that the battery pack and electronic control circuit are mountable to and removable from the downhole tool as a single unit; and
  wherein the electronic control circuit comprises a switch which is arranged to automatically short circuit the motor to brake the motor to resist rotation of the motor in an undesired direction until operation of the electric motor is desired; and
  wherein the magnetic brake comprises at least one magnet located between the electric motor and the gearbox, wherein the at least one magnet further resists rotation of the motor; and
  wherein when operation of the electric motor is to commence, the electronic control circuit overrides the short circuit and opens said switch to permit the battery pack to power the motor under instruction of the electronic control circuit and rotate the electric motor in the desired direction.

Embodiments of the present invention in accordance with the second aspect have a big advantage that unwanted reverse rotation of the electric motor (which could occur, for instance, because of an attached lead screw being stroked in due to hydrostatic pressure increasing whilst the downhole tool is being run into the wellbore) is resisted, thus preventing unwanted accidental setting of a further (second) downhole tool attached to said downhole (setting) tool.

The addition of a magnetic brake with the short circuit of the motor enhances the braking effect of the short circuit and further resists unwanted reverse rotation.

Preferably, the power control module further comprises a positive electric output terminal and a negative electric output terminal for supplying electric power from the battery pack to a respective positive electric input terminal and a respective negative electric input terminal provided on the electric motor. Typically, the battery pack is mountable to the electric motor such that the positive electric output terminal of the power control module is in electrical communication with the positive electric input terminal of the electric motor and the negative electric output terminal of the power control module is in electrical communication with the negative electric input terminal of the electric motor. Typically, the battery pack is removable from the downhole tool such that the positive electric output terminal of the power control module is not in electrical communication with the positive electric input terminal of the electric motor and the negative electric output terminal of the power control module is not in electrical communication with the negative electric input terminal of the electric motor.

Typically, the electronic control circuit comprises a Printed Circuit Board (PCB) mounted within the power control module, preferably at or towards the upper end thereof in use.

Typically, the PCB can reverse the polarity of the electrical supply from the battery pack to the electrical motor, such that the motor can be operated in the reverse direction to rotate the output of the electrical motor in a reverse direction as well as a forward direction.

Preferably the power control module further comprises a data and/or power port which can be used by an operator to connect a display unit when the power control module is at surface to view the current being supplied by the battery pack or other characteristics of the power control module, electronic control circuit or battery pack. Typically, a motion detection means such as a single or 3-axis accelerometer may be provided either within the power control module or another component of the downhole tool and data output from the accelerometer can be input into the electronic control circuit and can be used by the electronic control circuit to indicate whether the downhole tool has completed an operation. Alternatively, or additionally, the electronic control circuit can monitor the electric motor current such as by use of an algorithm to detect what stage of operation the downhole tool is at.

Optionally the magnetic brake comprises more than one magnet. Optionally the magnetic brake comprises a plurality of magnets. Optionally the magnets are housed within orifices formed in an end plate located between the gear box and the electric motor. Optionally the magnets are located on the side of the end plate closest to the gear box, i.e. the input side. The advantage of placing the magnets at the input side of the gear box as opposed to e.g. the output side of the gear box is that significantly less force is required to brake the motor/gears at this location due to the effects of the gear ratios provided by the gearbox, i.e. it is easier for the electric motor to break the magnetic attraction.

Optionally the end plate comprises a central aperture within which an input shaft of the gearbox is located. Optionally the magnets are arranged around the aperture receiving the input shaft. Optionally the magnets are located adjacent to the input shaft of the gearbox. Optionally the magnets are symmetrically arranged around the aperture, optionally within an annular recess or groove formed in the end plate. Optionally the magnets are arranged in groups, and optionally the groups of magnets are symmetrically arranged around the aperture. Optionally the magnets are partially received within the orifices in the end plate, or alternatively fully received within the orifices. Optionally the magnets are partially or fully received within a flange located at an end of the input shaft. Optionally, the end plate may comprise magnets inserted into orifices therein, and the flange of the input shaft may comprise magnets inserted into orifices therein. Optionally, the magnets may be cylindrically shaped.

Optionally the groups of magnets may be in odd or even numbers. Optionally the magnets may be arranged so that all of the magnets in a group are aligned in the same polar configuration. Optionally the magnets may be arranged so that at least one group is in a different polar configuration from at least one other group, for example, at least one group may have their south poles facing in the direction of the electric motor while another group may have their north poles facing in the direction of the electric motor. Optionally the magnets within a group may alternate in their polar configuration, for example, if a group of magnets in the end plate comprises three magnets, the configuration may be North-South-North poles facing towards the electric motor, and therefore South-North-South facing towards the flange of the input shaft. Optionally the magnets arranged on the input shaft are configured with the opposing arrangement to permit a magnetic attractive force to be set up between the magnets in the flange and the magnets in the end plate. Optionally the magnets may be arranged to align the flange and end plate in a particular position and resist rotation away from this position.

Optionally the magnets are positioned at the same distance away from the central axis of the tool on the end plate and on the flange so that optionally they may be aligned with each other, optionally in a longitudinal direction. Optionally the positive and negative poles are adjacent. Optionally the magnets act to draw the input shaft and flange towards the end plate, for example the magnets may "snap" together and resist rotational displacement of the two components.

Optionally at least one retainer washer is positioned over the magnets in the end plate and/or the flange to retain the magnets in the orifices. Optionally the retainer washer is dimensioned to fit within the annular recess or groove in the end plate. Optionally the at least one retainer washer is affixed, for example spot welded, to the gearbox end plate and/or the magnets and/or the flange at the end of the input shaft.

Preferably the retainer washer(s), flange and the end plate are made of non-ferrous material.

Optionally the magnets positioned around the end plate and optionally the flange interfere with the magnets within the electrical motor. Optionally the magnetic interference enhances braking by increasing the resistance of the motor to rotation. Optionally the magnets do not significantly affect rotation when the short circuit is removed from the motor and the motor begins turning.

According to a third aspect of the present invention there is provided a power control module for use in a downhole tool run into a wellbore on slick e-line, the power control module comprising:

a housing;

a battery pack; and an electronic control circuit for controlling operation of the battery pack;

wherein the electronic control circuit comprises a switch which is arranged to switch upon receipt of a signal sent from the surface via the slick e-line, wherein the electronic control circuit controls the battery pack to send power from the battery pack to the downhole tool; and wherein the housing is configured to contain the battery pack and electronic control circuit such that the battery pack and electronic control circuit are mountable to and removable from the downhole tool as a single unit.

Embodiments of the present invention in accordance with the third aspect have a big advantage that the power control module does not require a complicated and/or expensive power convertor/transformer to step down the 300V voltage supplied from the e-line to the 24 Volts or 48 Volts typically required by a DC electric motor utilised in the downhole tool; rather, the electronic power control module can instruct the battery pack to power the DC electrical motor as and when required by an operator to operate to e.g. set a further (second) downhole tool such as a downhole plug in the desired downhole location in the wellbore.

Preferably the motor comprises a shock absorbing mechanism to assist in protecting the motor from shocks or vibrations experienced downhole by the downhole tool. Preferably, the motor is located within a housing and comprises an upper shock absorber located in between the upper end of the housing and the upper end of the motor and a lower shock absorber located in between the lower end of the housing and the lower end of the motor.

Preferably, the power control module further comprises a pressure operated switch, or temperature operated switch, which only allows the battery pack to power the electrical motor when a certain pressure, or temperature, has been experienced (i.e. once the power control module has reached a certain depth and/or pressure/temperature of downhole fluid has exceeded the set pressure/temperature limit).

Alternatively, or additionally, the electronic control circuit can be instructed from the surface, e.g. via e-line, to allow the battery pack to power the electrical motor when the operator requires actuation of the downhole tool. Alternatively, or additionally, the electronic control circuit can be instructed to allow the battery pack to power the electrical motor after a pre-determined period of time has elapsed via a timer arrangement, and typically the timer arrangement countdown can be commenced either at surface just prior to running the downhole tool into the wellbore (particularly if the downhole tool is run in on slickline), or the countdown can be commenced upon receipt of a signal sent from the surface (particularly if the downhole tool is run in on e-line in which case the signal is preferably sent via said e-line).

According to a fourth aspect of the present invention there is provided a gearbox for use in a downhole tool, the gearbox comprising:

two or more stages, wherein each stage is adjacent to the next stage; and wherein each stage comprises:

a sun gear having a respective diameter;

wherein each sun gear is in touching contact with the sun gear of the next adjacent stage by a raised portion which comprises a smaller diameter than the diameter of the respective sun gear; and wherein each raised portion comprises a substantially convex shape.

Preferably said portion of each sun gear comprises a raised portion which projects longitudinally outwardly from the central longitudinal axis of the sun gear and more preferably projects outwardly towards the outwardly projecting raised portion of the adjacent sun gear.

Preferably, the raised portion of the sun gear is integral with the sun gear. Alternatively, the raised portion may be a separate component and may be formed from a different material which could be harder or softer wearing than the material of the sun gear.

Embodiments of the present invention in accordance with the fourth aspect have a big advantage that the said portions have a smaller contact surface area than would otherwise be the case if the whole upper and lower face of the sun gear was in contact with the adjacent respective lower and upper face of the adjacent sun gear and thus lower friction is experienced between the sun gears when they rotate at different speeds with respect to one another. In addition, because the sun gears of the respective stages are all in constant contact with one another via said outwardly projecting raised portions, any shocks or vibrations that affect the downhole tool are transmitted through the spine provided along the length of the gearbox by the raised portions of each stage being in direct contact with the adjacent raised portion of the next stage of the gearbox, rather than the shock or vibration jarring each stage of the gearbox.

The preferred convex shape of each raised portion has the significant advantage that it reduces the stress concentration compared with e.g. a cylindrical shape meeting a cylindrical shape end face on. Preferably, the raised portions are in the shape of a raised convex dimple. Optionally the radius of the raised convex dimples is substantially constant around the whole dimple. Optionally the raised portions contact each other at a substantially single point. Optionally the raised portions contact each other at a slightly flattened section relative to the radius of the dimple.

Optionally the gearbox comprises an end plate. Optionally the end plate is configured to receive an input shaft of the gearbox. Optionally the end plate comprises a bearing set, optionally comprising bearings configured to reduce rotational friction and bearings to support axial loading. For example, the bearing set may comprise ball bearings and thrust bearings. Optionally the bearing set is in an annular configuration around the aperture of the end plate in which the input shaft of the gearbox is received. Optionally the bearing set is coaxial with the aperture, and optionally coaxial with the input shaft when the tool is assembled.

An advantage of the gearbox arrangement is that the load experienced by the tool is transmitted through the dimples via the contact points and onto the thrust bearings. The gearbox is designed to avoid isolation of gears and instead transmits load through the gears. A further advantage of this is that the tool does not rely upon hydraulic damping and instead, loads can be transmitted through the tool for e.g. emergency detachment. In the event that jarring of the tool may be required, hydraulic damping would detrimentally affect the effectiveness of the jarring operation and potentially delay the release of the tool. In contrast, the present tool, particularly the gearbox, has a jar path through the tool that transmits the load right through the tool, along a fully metal (and hence resilient) load path.

Optionally there is provided a gearbox for use in a downhole tool, the gearbox comprising an outer housing and one or more stages, each stage optionally comprising a sun gear, an outer ring gear and one or more planetary gears which are arranged to orbit around the sun gear and within the outer ring gear. Optionally the outer ring gear is formed integrally with the outer housing on an inner throughbore surface of the outer housing.

Preferably, there are two or more stages in the gearbox and more preferably, each stage is adjacent the next stage. Most preferably, the outer ring gear comprises a plurality of teeth formed on the inner throughbore surface of the outer housing and preferably, the plurality of teeth are arranged around the entire inner circumference of the inner throughbore surface of the outer housing and more preferably are arranged to extend continuously along a length at least as long as the longitudinal axial distance between the two or more stages such that the plurality of teeth of the outer ring gear are typically longer in length than the longitudinal axial distance between the two or more stages. This offers the advantage that the plurality of teeth formed on the inner throughbore surface of the outer housing are integral with the outer housing and thus are not formed on a separate component to that of the outer housing, and thus the outer housing can be of a smaller sidewall thickness than would otherwise be the case compared with, e.g., the sidewall thickness of an outer housing and a separate component which itself had the plurality of teeth formed on its inner throughbore surface.

Typically, the outer housing comprises suitable connection means such as screw threads to connect with other sub-assemblies of the downhole tool such as a motor housing on one end and typically a lead screw assembly housing on the other end.

Optionally there is provided a lead screw assembly for use in a downhole tool, the lead screw assembly comprising a lead screw which, in use, is rotatable by a rotary movement mechanism, the lead screw comprising a screw thread on its outer surface; a ball nut having a screw thread formed on its inner surface and being arranged around the lead screw and being engaged with the screw thread of the lead screw such that rotation of the lead screw results in axial movement of the ball nut; and a rod member secured to the ball nut such that axial movement of the ball nut causes axial movement of the rod member with respect to the lead screw; wherein the rod member comprises a central bore formed therein and wherein the lead screw is further arranged such that at least a portion of the length of the lead screw is located within the central bore of the rod member.

Preferably, the lead screw comprises two ends, a first end being coupled with the rotary movement mechanism and a second end which is preferably a free end.

Preferably, the free end is located with the central bore of the rod member and is further preferably arranged to stroke further into the central bore of the rod member as the rod member moves longitudinally along the length of the lead screw.

Typically, the rod member and the lead screw are moveable between three configurations:—
  i) a fully stroked out configuration, in which only a relatively short length of the lead screw is located within the central bore of the rod member;
  ii) a part way stroked in configuration, in which a part of the length of the lead screw (said part length being shorter than the fully stroked out length but longer than the fully stroked in length) is located within the central bore of the rod member; and
  iii) a fully stroked in configuration, in which a relatively long length of the lead screw is located within the central bore of the rod member.

Typically, the rod member comprises a distal end which is connectable to a tool which requires to be set downhole such as a plug or the like which is actuable by having a component pulled, or pushed, in an axial direction.

The accompanying drawings illustrate presently exemplary embodiments of the disclosure and together with the general description given above and the detailed description of the embodiments given below, serve to explain, by way of example, the principles of the disclosure.

In the description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments of the present invention are shown in the drawings, and herein will be described in detail, with the understanding that the present disclosure is to be considered an exemplification of the principles of the invention and is not intended to limit the invention to that illustrated and described herein. It is to be fully recognized that the different teachings of the embodiments discussed below may be employed separately or in any suitable combination to produce the desired results.

The following definitions will be followed in the specification. As used herein, the term "wellbore" refers to a wellbore or borehole being provided or drilled in a manner known to those skilled in the art. The wellbore may be 'open hole' or 'cased', being lined with a tubular string. Reference to up or down will be made for purposes of description with the terms "above", "up", "upward", "upper" or "upstream" meaning away from the bottom of the wellbore along the longitudinal axis of a work string toward the surface and "below", "down", "downward", "lower" or "downstream" meaning toward the bottom of the wellbore along the longitudinal axis of the work string and away from the surface and deeper into the well, whether the well being referred to is a conventional vertical well or a deviated well and therefore includes the typical situation where a rig is above a wellhead and the well extends down from the wellhead into the formation, but also horizontal wells where the formation may not necessarily be below the wellhead. Similarly, 'work string' refers to any tubular arrangement for conveying fluids and/or tools from a surface into a wellbore. In the present invention, e-line, slick-eline, slickline or wireline is the preferred work string.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention. Additionally, any feature disclosed in the specification can be combined alone or collectively with other features in the specification to form an invention.

Various embodiments and aspects of the invention will now be described in detail with reference to the accompanying figures. Still other aspects, features and advantages of the present invention are readily apparent from the entire description thereof, including the figures, which illustrates a number of exemplary embodiments and aspects and implementations. The invention is also capable of other and different embodiments and aspects and its several details can be modified in various respects, all without departing from the scope of the present invention as defined by the claims.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

Accordingly, the drawings and descriptions are to be regarded as illustrative in nature and not as restrictive. Furthermore, the terminology and phraseology used herein is solely used for descriptive purposes and should not be construed as limiting in scope. Language such as "including", "comprising", "having" "containing" or "involving" and variations thereof, is intended to be broad and encompass the subject matter listed thereafter, equivalents and additional subject matter not recited and is not intended to exclude other additives, components, integers or steps. In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including" or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention as defined by the claims.

All numerical values in this disclosure are understood as being modified by "about". All singular forms of elements, or any other components described herein including (without limitations) components of the downhole tool are understood to include plural forms thereof and vice versa.

BRIEF DESCRIPTION OF THE DRAWINGS

Embodiments of the present invention, will now be described by way of example only, with reference to the accompanying drawings, in which:

FIG. 1a is a cross-sectional view of an embodiment of a setting tool assembly in accordance with the present invention, where the cross-sectional view is a cross section A-A of FIG. 1b and where the setting tool assembly comprises a housing which houses:
  a power control module (PCM) (as shown in more detail in FIG. 2);
  a motor sub-assembly (as shown in more detail in FIG. 3);
  a gearbox sub-assembly (as shown in more detail in FIG. 4); and
  a linear drive sub-assembly (as shown in more detail in FIG. 5);

FIG. 1b is an end view of the setting tool assembly of FIG. 1a and also shows the section A-A line;

FIG. 2 is a cross-sectional side view of the power control module (PCM) of the setting tool assembly of FIG. 1a, where the PCM is in accordance with the first, second, and third aspects of the present invention;

FIG. 3 is a cross-sectional view of the motor sub-assembly of the setting tool assembly of FIG. 1a;

FIG. 4 is a cross-sectional view of the gearbox sub-assembly of the setting tool assembly of FIG. 1a, where the gearbox sub-assembly is in accordance with the fourth aspect of the present invention;

FIG. 5 is a cross-sectional view of the linear drive sub-assembly of the setting tool assembly of FIG. 1a;

FIG. 6a is a more detailed cross-sectional view of the power control module (PCM) of FIG. 2, where the cross-sectional view is across section F-F of FIG. 6d;

FIG. 6b is a first perspective end view of the PCM of FIG. 6a;

FIG. 6c is a perspective view of the second (other) end of the PCM of FIG. 6a;

FIG. 6d is an end view of the second (other) end of the PCM of FIG. 6a and shows the section line section F-F (along which FIG. 6a is the cross-sectional view);

FIG. 6e is a schematic layout of the main components provided in the PCM of FIG. 6a and the connections therebetween and the connections between the PCM of FIG. 6a and an optional switch module and the connections between the said optional switch module and the motor sub-assembly of FIG. 3—the skilled person should note that the optional switch module shown in FIG. 6e is not actually shown in FIG. 1a but if it is included in the setting tool assembly then it would be located in between the PCM and the motor sub assembly of FIG. 1a;

FIG. 7a is a cross-sectional view along section line J-J of the motor sub-assembly of FIG. 3, where the section line J-J is shown in FIG. 7b;

FIG. 7b is an end view of the motor sub-assembly of the setting tool assembly of FIG. 3;

FIG. 8a is a perspective view of an inner gear assembly that is incorporated within the gearbox sub-assembly of FIG. 4;

FIG. 8b is an end view of the in use uppermost end (left hand-most end—the end that is closest to the motor sub-assembly as shown in FIG. 1a) of a second and more preferred embodiment of a gearbox sub-assembly in accordance with the fourth aspect of the present invention and for inclusion in the setting tool assembly of FIG. 1(a), where the section line G-G is shown in FIG. 8b and which forms the section as shown in FIG. 8c;

FIG. 8c is a cross-sectional view along section G-G of the gearbox sub-assembly of FIG. 8b;

FIG. 8d is a perspective cross-sectional side view of a gear housing of the gearbox sub-assembly of FIG. 8b along section G-G of FIG. 8b, where the gear housing in use houses the inner gear assembly of FIG. 8a and where the gear housing and inner gear assembly are shown as being combined together in the cross-sectional view of FIG. 8c;

FIG. 8e is a very detailed close up view of detail area H of FIG. 8c, where FIG. 8e in particular shows a dimple feature on each sun gear in accordance with a fourth aspect of the present invention;

FIG. 8f is a very close-up view of another example of two dimple features in facing contact in accordance with a fourth aspect of the present invention;

FIG. 10a is a perspective view of a gearbox in accordance with the fourth aspect of the invention, and the exploded view of the magnetic brake as illustrated in FIG. 9, to show how the components fit together;

FIG. 10b. is a perspective view of the gearbox and magnetic brake of FIG. 10a fully assembled together;

FIG. 11a is a first cross-sectional end view of the linear drive sub-assembly of FIG. 5 and which shows both section lines K-K (which forms the section used in FIG. 11d) and section lines M-M (which shows the section as shown in FIG. 11c);

FIG. 11b is a second cross-sectional end view of the linear drive sub-assembly of FIG. 5 across section N-N where section line N-N is shown in FIG. 11c;

FIG. 11c is a cross-sectional side view along section M-M of the linear drive assembly of FIG. 11a and where FIG. 11c also shows the section line N-N (which forms the section shown in FIG. 11b), where the linear drive assembly is shown in the fully stroked out configuration; and FIG. 11d is a cross-sectional side view along section K-K of the linear drive assembly of FIG. 11a, where the linear drive assembly is shown in the fully stroked out configuration.

DETAILED DESCRIPTION OF EXAMPLES OF THE INVENTION

Figure 6E:
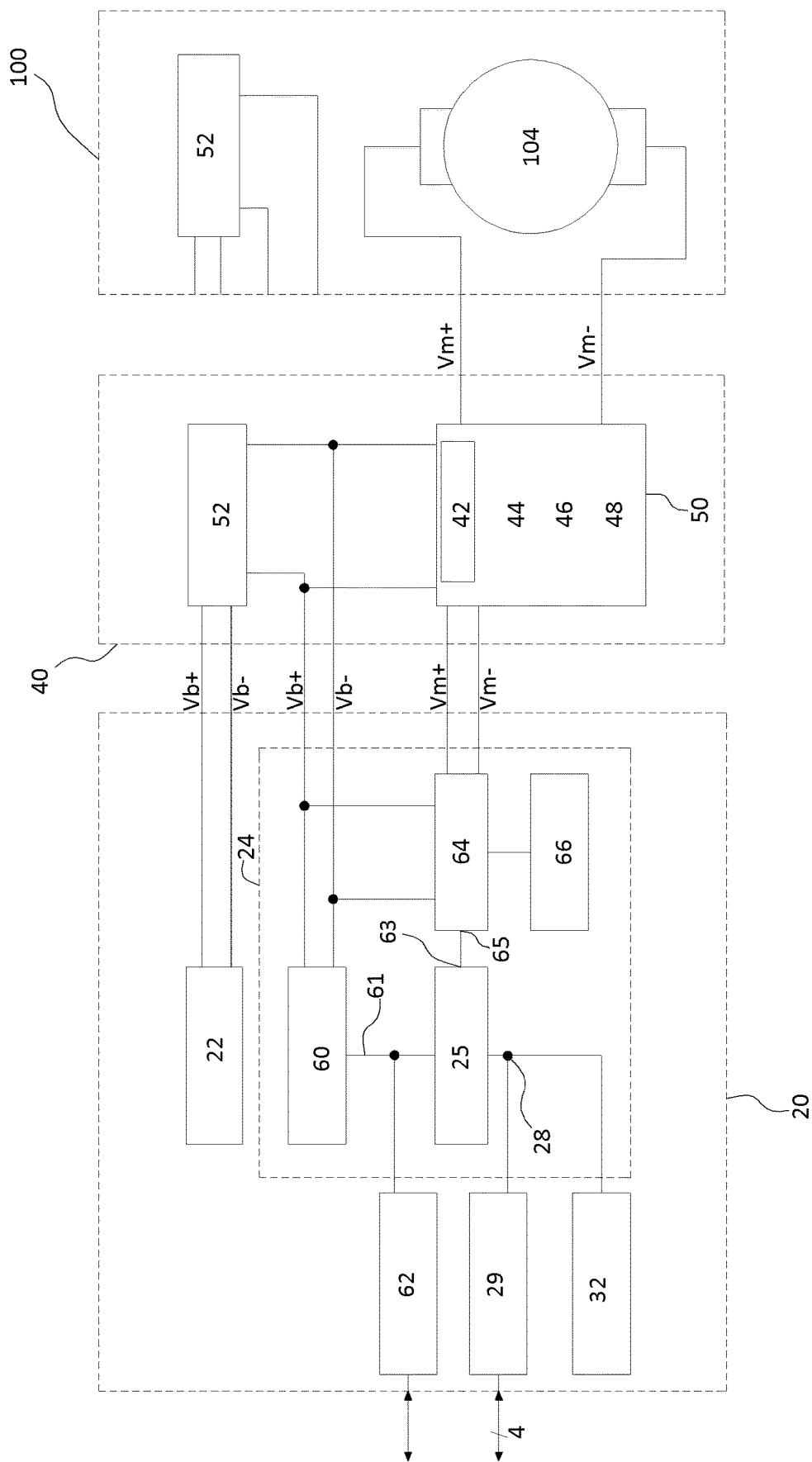

FIGS. 1a and 1b show a first embodiment of setting tool assembly 1 in accordance with the present invention and which can be actuated when downhole to provide a linear (longitudinally or axially) directed force (i.e. push or pull upwards/downwards) when required, for example to operate another downhole tool (not shown) such as a plug (not shown) to set the plug used when frac'ing a well. It should be noted that the setting tool assembly 1 could also be used to actuate other tools downhole (not shown) when required such as to set a sliding sleeve (not shown) or to set a casing patch (not shown) or any other downhole application that requires force/load to be applied downhole.

The setting tool assembly 1 comprises at its uppermost end (left hand end as shown in FIG. 1a) a suitable coupling 3 such as a wireline socket, e-line socket or slickline socket in order to permit the setting tool assembly 1 to be coupled respectively to wireline, slickline or e-line as appropriate and required by the operator in order to run the setting tool 1 into the borehole and pull the setting tool 1 from the borehole when required by the operator. The lower end of the coupling 3 is connected via a suitable connection such as screw threads 5 to the upper end of a housing 7 for housing a power control module (PCM) 20 as will be subsequently described. Suitable seals 9 are provided and act between the outer surface of the coupling 3 and the inner surface of the housing 7 in order to prevent unwanted downhole fluid from entering into the housing 7.

The lower end of the housing 7 is coupled via suitable connections such as screw threads 101U to the upper end of a motor sub-assembly 100 where the motor sub-assembly 100 comprises a motor housing 102 and which houses the motor 104 within its through bore 103. Suitable seals such as O-ring seals 106 are provided between the lower end of the housing 7 and the upper end of the motor housing 102 to avoid unwanted ingress of downhole fluid therebetween.

The lower end of the motor sub-assembly 100 is coupled to the upper end of an upper gear housing 202 of a gearbox sub-assembly 200 via a suitable connection such as screw threads 101L and again, suitable seals such as O-ring seals 108 are located between the lower end of the motor housing 102 and the upper end of the gear housing 202 in order to prevent unwanted ingress of fluid such as downhole fluid therebetween.

The gearbox sub-assembly 200 as shown in FIG. 4 comprises an upper gear housing 202 which is connected at its (in use) lowermost end (the right-hand end as shown in FIG. 4) via suitable connections such as screw threads 203 to the (in use) upper end of a lower gear housing 204, where suitable seals such as O-ring seals 205 are provided between, and act between, the lower end of the upper gear housing 202 and the upper end of the lower gear housing 204 in order to prevent fluid gaining access into the inner gear assembly 210, where the inner gear assembly 210 is housed within and secured within the upper and lower gear housings 202, 204.

At this point, it should be noted that the gearbox sub-assembly 200 of FIG. 4 differs from the gearbox sub-assembly 300 as shown in FIG. 8c, in that whereas both gearbox sub-assemblies 200, 300 house the same inner gear assembly 210 (as shown in FIG. 8a), the gearbox sub-assembly 200 comprises the upper gear housing 202 and the separate lower gear housing 204, whilst the gearbox sub-assembly 300 has a single gear housing 302 as shown in FIG. 8d. In addition, and as will be subsequently described, the gearbox sub-assembly 200 further comprises an inner gear housing 207 which is secured to the inner bore of the upper gear housing 202 such that the inner gear housing 207 cannot rotate with respect to the upper gear housing 202. In addition, the inner gear housing 207 has an arrangement of inner gear teeth 208 formed on its inner surface which mesh with and co-operate with the teeth in each of the various stages of the inner gear assembly 210 as will be subsequently described. In contrast, the single gear housing 302 of the preferred embodiment (second embodiment) of gearbox sub-assembly 300 comprises the inner gear teeth 308 formed directly on its inner bore surface (without the need for the additional/separate component of the inner gear housing 207 as utilised in the less preferred first embodiment of gearbox sub-assembly 200). Accordingly, the second and more preferred embodiment of gearbox sub-assembly 300 has the advantage that it has a greater inner diameter than that of the less preferred first embodiment of gearbox sub-assembly 200 and therefore the inner gear assembly 210 can handle greater load through it than would be the case for the inner gear assembly 210 used in the less preferred first embodiment of gearbox sub-assembly 200. In all other respects, the first embodiment of gearbox sub-assembly 200 and second embodiment of gearbox sub-assembly 300 are similar to one another.

Whichever embodiment of gearbox sub-assembly 200 or 300 is used in the setting tool assembly 1, its lower end 209, 309 is coupled via suitable connections such as screw threads to the upper end of a linear drive sub-assembly 400. The linear drive sub-assembly 400 is included in the setting tool assembly 1 in situations where linear force or drive (i.e. force parallel (up/right to left or down/left to right) to the longitudinal axis X-X of the setting tool assembly 1) is required in order to actuate another tool (not shown) downhole such as a plug used in frac'ing operations etc. The skilled person will understand that linear force is force in either the upward (right to left as shown in FIG. 5 in the direction of the arrow U) or in the downward direction (as shown in FIG. 5 from left to right or in the direction of the arrow D) and in either case in a direction that is parallel with the longitudinal axis X-X of the centre line of the linear drive sub-assembly 400 and thus the setting tool assembly 1. However, if only rotational force is required downhole to actuate another tool (not shown) such as a ball valve, etc. or for a cutting or punching operation that is conducted using rotary power/torque then the linear drive sub-assembly 400 can be omitted and the lower end of the gearbox sub-assembly 200 or 300 can be coupled directly to the upper end of the tool to be actuated by rotary power such as the ball valve, or punching/cutting tool etc.

The various main components of the setting tool assembly 1 will now be described in detail in turn.

Power Control Module (PCM) 20

The PCM 20 comprises two main components:—
a battery pack 22; and an electronic control circuit 24 both of which are contained within a generally cylindrical thin wall housing 26. Importantly, the housing 26 contains all of the components of the PCM 20 (specifically the battery pack 22 and the control circuit 24) and thus, removal of the housing 26 from the setting tool assembly 1 removes the PCM 20 from the setting tool assembly 1 in one single step.

The battery pack 22 comprises a suitable number of batteries and in the presently illustrated embodiment, preferably comprises two banks of AAA alkaline cell batteries 23B, but different batteries could be used and furthermore only one bank 23B of batteries may be provided or more than two banks of batteries may be provided. In the presently illustrated example, each bank of AAA batteries 23B comprise thirty-six AAA 1.5V batteries such that there are a total of seventy-two triple A batteries 23c and therefore the total voltage output of each of the banks of AAA 1.5 Volt cells 23B is 54 Volts.

The electronic control circuit comprises a printed circuit board 24 containing at least a microprocessor 25 or similar device having a suitable arrangement of integrated circuits, etc. and having associated programmable logic which can be controlled by an operator to, for example, allow the operator to set a timer which once the allotted number of hours or days has expired will instruct the battery pack 22 to power the motor sub-assembly 100 via a suitable switch arrangement (and which can be in the form of an optional switch module 40 (shown in FIG. 6e but not shown in FIG. 1a).

The PCB 24 is provided with a USB port 28 and which has its open socket end mounted in the upper end (left hand end as shown in FIG. 6a), but in other alternative embodiments (not shown) can also be positioned at the lower end (particularly if doing so will reduce the overall length of the PCM 20) of the thin wall housing 26 such that an operator can, when the thin wall housing 26 is removed from the housing 7 for the PCM 20, allow the operator to insert a USB cable 29, or handheld programmer (not shown), into the USB port 28 in order to programme instructions into the PCB 24 via a suitable computer such as a laptop or tablet computer (not shown), etc. Additionally, the USB port 28 allows an operator to firstly connect thereto and secondly use a hand held programmer with integral LCD display (not shown) at surface to view the current being supplied by the battery pack 22 or other characteristics of the PCB 24 or battery pack 22.

A different type of power and/or data port to the USB port 28 can also be used without departing from the scope of the invention.

The electronic control circuit can also be powered on by inserting a powered USB cable into the USB socket port 28.

As further shown in FIG. 6e, the PCM 20 further comprises a power conditioning unit 60 which is coupled to the battery 22 via a battery power switch 52 which will be described in more detail subsequently. It should be noted at this point though that the battery power switch 52 is shown twice in FIG. 6e, but only because the switch module 40 is optional and therefore if the switch module 40 is included in the setting tool assembly 1, then the battery power switch 52 shown in the motor module 100 is not required. However, if the switch module 40 is not included in the setting tool assembly 1 then the battery power switch 52 is shown as being included in the motor module 100.

Alternatively, one or more 3 axis accelerometers (not shown) may be provided at a suitable location within the PCM 20 and/or the switch module 40 (if present) or the motor module, where the 3 axis accelerometer can be used to provide a data input into the microprocessor 25 and thus be used to detect if the downhole setting tool assembly 1 has actuated correctly (and thus whether the setting tool assembly 1 has set the other downhole tool (such as a plug or valve). Additionally, or alternatively, the PCM 20, preferably by means of the microprocessor 25 can monitor the current of the electric motor 104 by use of a suitable algorithm to detect what stage of operation the electric motor 104 is at and thus what stage of setting the setting tool assembly 1 is at, because there will typically be a large longitudinal force generated by the linear drive assembly 400 and a corresponding change in motor 104 current when the setting tool assembly 1 has set the other downhole tool (such as a plug or valve).

The power conditioning unit 60 steps down the DC voltage delivered from the battery 22 via the battery power switch 52 from 54 Volts down to the required voltage for the microprocessor 25 and other components of the PCM 20, which will typically be 5 Volts.

The 5 Volt output 61 from the power conditioning unit 60 supplies the low voltage to a bi-directional communication unit 62, which is in electrical communication with the electrical socket 30 and permits data to be transmitted up the e-line from the PCM 20 to the operator at the surface or be received from the surface via the e-line, and can provide such data to or receive data from the microprocessor 25 in order to allow the operator at the surface to communicate with and receive information from the PCM 20.

The microprocessor 25 is also electrically connected to the USB port 28 and the LED 32. In addition, the microprocessor comprises a data output 63 which is electrically connected to a controller input 65 of a motor drive (Vm) unit 64 and which comprises a motor diagnostics unit 66 electrically connected thereto, and which can receive and store data from the motor drive (Vm) unit 64 for subsequent analysis by the operator.

The motor drive (Vm) unit 64 can be controlled by the microprocessor 25 to supply the 54 Volt electrical power from the battery 22 via the battery power switch 52 to the motor 104 (and if the switch module 40 is provided in the setting tool assembly 1, the said electrical power will be supplied from the motor drive (Vm) unit 64 to the motor 104 via the switch housing 50).

The switch housing 50 contains a physical switch 42 which is arranged to short circuit the motor when required (albeit only when the battery 22 is not connected to the motor 104) to prevent unwanted rotation of the motor 104 and this physical switch 42 will be described in more detail subsequently.

The switch housing 50 may contain other suitable switches such as a pressure switch 44 which can be closed and therefore will supply the power from the motor drive (Vm) unit 64 to the motor 104 when a certain downhole pressure has been sensed and thus the motor 104 will only be able to operate once that certain pressure and/or depth has been achieved by the setting tool assembly 1. That provides advantages to the operator because they will then know that the setting tool assembly 1 cannot be operated until a particular depth or pressure has been achieved/sensed by the setting tool assembly 1.

In addition, the switch housing 50 can also comprise a temperature switch 46 which will be arranged to only supply the power from the motor drive (Vm) unit 64 to the motor 104 once a certain downhole temperature has been sensed and again provides additional safety for an operator, because they will know that a certain temperature such as 80° C. will need to be encountered (typically relatively far down into the wellbore) by the setting tool assembly 1 before the motor 104 can be operated.

Finally, any other suitable switch 48 can also be incorporated into the switch housing 50 as per requirements of the operator.

In addition, once powered and in accordance with the second aspect of the present invention, the electronic control circuit or PCB 24 further is preferably connected to the physical switch 42 provided within the optional switch module 40 that automatically short circuits the electric motor 104 (until the PCB 24 further overrides and opens that switch 42) to brake the DC electrical motor 104 to stop the lead screw 404 undergoing unwanted rotation due to hydrostatic pressure acting upon and therefore trying to stroke in the slick rod 410 when running the setting tool assembly 1 downhole. It is highly advantageous to short circuit the motor 104 in this manner because otherwise the setting tool assembly 1 could unintentionally set the further downhole tool, such as a plug, to which it is attached via the attachment profile 414. It should be noted that suitable electronic switching elements (not shown) are provided within the PCB 24, which are arranged to maintain a short circuit on the motor 104 (until the PCB 24 further overrides those electronic switching elements) to brake the DC electric motor 104, and thus prevent back winding of the motor 104, should the optional switch module 40 not be included and thus not be connected in the setting tool assembly 1. In order to assist the physical switch 42 in braking the DC electrical motor 104 (when required), an arrangement of magnets 211m, 219m are also provided, which will be described subsequently.

In addition, a suitable electrical socket such as a 4 mm banana electrical socket is also electrically connected to the PCB 24, where the electrical socket 30 is mounted within the upper end of the thin wall housing 26 and permits a suitably sized banana plug leading from the e-line coupling 3 to be located therein, and therefore permits the electrical e-line (not shown) to be electrically coupled to the PCB 24 in order to permit data to be transmitted to the PCB 24 from the surface via the e-line (not shown). In addition, the PCB 24 is provided with a suitable visual indication means such as LED 32 connected thereto, where the LED 32 can be arranged to be lit when power is provided to the PCB 24 from the battery pack 22. The LED 32 can also be arranged (preferably by displaying a different colour or flashing at a different frequency etc.) to indicate successful programing by the operator and/or provide a visual confidence check of the countdown timer status.

The lower end of the thin wall housing 26 is provided with a number of suitable electrical sockets 34 in order to electrically couple the battery pack 22 to one or more suitable electrical connectors 112 provided at the upper end of the motor housing 102.

At a minimum, two 34A+, 34A− electrical sockets are provided at the lower end of the thin wall housing 26, where one electrical socket 34A+ is connected to the electrical output from the +ve (positive) voltage output of the battery pack 22 and a second electrical socket 34A− is electrically coupled to the −ve (negative) voltage output of the battery pack 22, where the said two electrical sockets 34A+, 34A− in use are in electrical connection with corresponding +ve 4 mm electrical jack connectors 112A+ and the negative electrical socket 34A− is in use in electrical connection with the −ve four millimetre electrical jack connector 112A− of the motor housing 102. The +ve electrical connector 112A+ and the −ve electrical connector 112A− are directly coupled to the positive and negative respective voltage inputs of the motor 104 which is preferably a 48V DC motor.

However, preferred embodiments of the present invention in accordance with one or more aspects of the present invention (and in particular with the first aspect of the present invention) additionally have further suitable electrical connections acting between the PCM 20, the PCB 24 and the motor sub-assembly 100 and in particular, an additional two electrical sockets 34B are provided at the lower end of the thin wall housing 26 and are arranged to be coupled in use with two further four millimetre electrical jack connectors 112B and where the electrical jack connectors 112B are themselves directly coupled to one another via a suitable electrical wire connection (not shown) such that the two electrical jack connectors 112B will effectively short circuit the said two electrical sockets 34B in order to complete the circuit there between and because the two said electrical sockets 34B are themselves in effect electrically connecting the battery pack 22 to the PCB 24 via one of the positive or negative electrical sockets 34A+ or 34A−, the connections between the electrical sockets 34B and the electrical connectors 112B in effect act as a battery power switch 52 which when they are connected (i.e. when the switch 52 is closed) permits power to be transferred from the battery pack 22 to the PCB 24 (and if the PCB 24 instructs then to further power the electrical motor 104 to operate) but when the said connectors 112B are not electrically coupled with the said sockets 34B (i.e. the switch 52 is open), the battery pack 22 cannot transfer any power to the PCB 24 and therefore the battery pack 22 is effectively switched off from the PCB 24. This arrangement of electrical sockets 34B and electrical connectors 112B has the great advantage that the battery pack 22 will retain its power for much longer than otherwise would be possible because the battery pack 22 will only be electrically coupled to the PCB 24 when the said electrical sockets 34B and the connectors 112B are engaged with one another (i.e. the switch 52 therebetween is closed).

Accordingly, the PCB 24 can be powered on by a variety of different methods such as inserting a USB lead into the USB port 28; sending a signal from surface via the e-line into the electrical socket 30; and/or stabbing the PCM 20 into engagement with the plugs provided on the upper end of the motor assembly 100. In addition, the operator can programme the microprocessor 25 within the PCB 24 to power on after a certain amount of time has elapsed and this would be useful if the operator is using slick line to run in the downhole setting tool assembly 1. In addition, the embodiments of the present invention have the advantage that the electrical power can only be supplied to the motor 104 from the battery 22 once e.g. the pressure sensor associated with the pressure switch 44 has experienced the set pressure and/or the temperature sensor associated with the temperature switch 46 has experienced the set temperature.

Additionally, the USB port 28 allows an operator to use a hand held LCD display (not shown) at surface to view the current being supplied by the battery pack 22 or other characteristics of the PCB 24 or battery pack 22, including the output and thus the status of the 3 axis accelerometer to detect if the operation of the motor 104 and thus the linear drive assembly 400 has been successful.

Overall, the PCM 20 has the great advantage that because most of the components required to provide power to the motor 104 are contained within the PCM 20, the PCM 20 can be mass produced thus significantly bringing down production costs and therefore the PCM 20 can be regarded as a one-time use component which, after being run in to a wellbore and pulled therefrom, can be removed from the setting tool assembly 1 and can be disposed of/recycled at the convenience of the operator and the operator can quickly and easily fit a new PCM 20 in to the setting tool assembly 1 for the next run/operation. Furthermore, because the PCM 20 uses low cost, highly available standard batteries such as AAA cells 23c, it is much more straightforward for an operator to be able to insert new banks of batteries 23c should they require to do so and moreover the cost of a PCM 20 is significantly lower than conventional power conversion systems used in conventional setting tool assemblies which require expensive power converters to convert the power run down the e-line from surface.

Motor Sub-Assembly 100

The positive 112A+ and negative 112A− electrical 4 mm jack connectors 112 as described above are located at the upper end of the motor sub-assembly 100 and are directly electrically connected to the respective positive + and negative − power input terminals of the electrical DC motor 104. The motor housing 102 comprises a central bore 103 within which is located the DC motor 104.

It should be noted that the DC motor 104 is advantageously cushioned at each longitudinal end by a respective shock absorber in the form of an O-ring shock absorber 105 such that the DC motor 104 is protected from vibrations or shocks which occur to the motor sub-assembly 100 and/or the overall downhole setting tool assembly 1 in that the upper O-ring shock absorber 105U and the lower O-ring shock absorber 105L help to dampen such shocks or vibrations which occur in the longitudinal direction and thus the DC motor 104 "floats" within the bore 103 and is therefore protected and thus the life of the DC motor 104 is significantly extended by the arrangement of the shock absorbers 105U, 105L. Alternatively, the O-ring shock absorbers 105U, 105L could be any other suitable shock absorbing means such as coiled springs or belleville springs (not shown).

The rotary output 110 of the DC motor 104 is rotationally and longitudinally splined to a spring loaded output coupling 114 such that when the rotary output 110 rotates, the spring loaded output coupling 114 also synchronously rotates therewith. Additionally, a spring 116 acts between the lower end of the DC motor 104 and the upper end of the output coupling 114 such that the spring biases the output coupling 114 away from the DC motor 104 and against an internal shoulder 118 of the lower end of the motor housing 102 such that the output coupling 114 is always biased against the shoulder 118 and thus the output coupling 114 will always be biased into the longitudinal position showing in FIG. 7a and therefore the output coupling 114 will always be in rotational coupling connection with an upper end of an input shaft 212 of an inner gear assembly 210 as will be subsequently described.

The DC motor 104 is preferably a brushed 48 Volt DC motor capable of outputting up to around 5000 RPM or more.

Gearbox Sub-Assembly 200

An upper end of the input shaft 212 of the inner gear assembly 210 is arranged to project into and be located within the bore of the spring loaded output coupling 114 of the motor assembly 100. The input shaft 212 is generally cylindrical but also comprises a flat surface 213 provided around a portion of the circumference and which is arranged to make contact with a similarly shaped flat surface provided on the inner bore 115 of the spring loaded output coupling 114, such that the input shaft 212 is keyed to and thus is rotationally locked with respect to the output coupling 114.

Accordingly, any rotation of the rotary output 110 of the electric DC motor 104 results in identical rotation of the input shaft 212 due to the mating co-operation of the pair of flat surfaces 213.

The input shaft 212 is rotationally mounted within an end plate 214 by means of a bearing set 217 comprising a ball bearing race 216 and thrust bearing arrangement 218 such that the input shaft 212 can rotate in a relatively frictionless manner with respect to the gear box housing (302; 202, 204).

Figure 9:
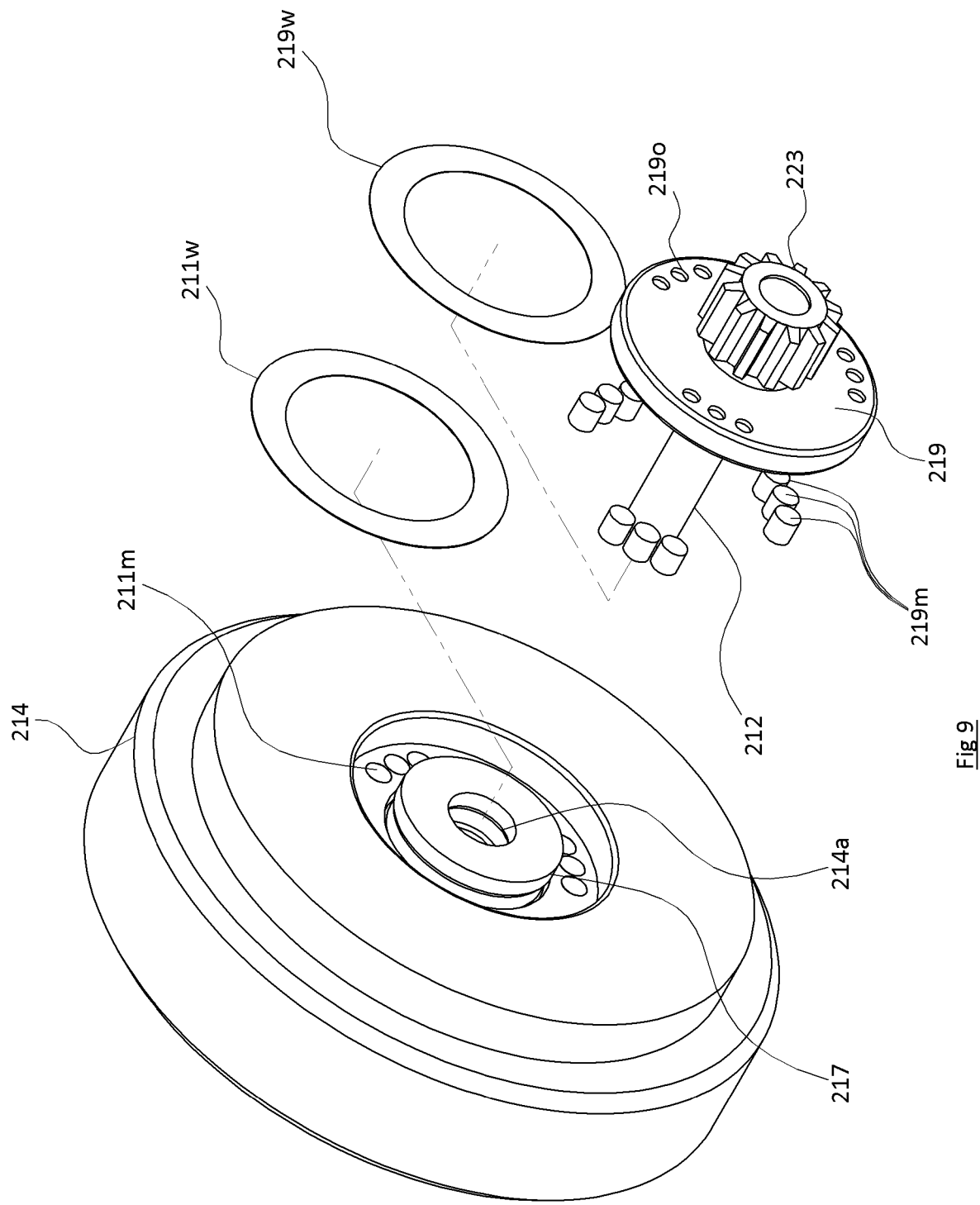
FIG. 9 is an exploded view of the magnetic brake in accordance with the second aspect of the invention.

The end plate 214 further comprises orifices 211o, disposed within an annular recess 214r formed in the end plate 214 as illustrated in FIGS. 9 and 10a. A cylindrically-shaped magnet 211m can be received in each orifice 211o. In this example, nine magnets 211m are distributed in a symmetrical arrangement around the recess 214r, in groups of three magnets 211m. The annular recess 214r is formed around a central aperture 214a through which the input shaft 212 passes, and the magnets 211m are therefore arranged around the input shaft 212 when the tool is assembled. Optionally the orifices 211o comprise through holes at the opposite end of each orifice 211o to the end in which the magnets 211m are inserted, but the through-holes are of a smaller dimension, e.g. a smaller diameter, than the magnets 211m. The magnets 211m are thus prevented from passing through the other end of the orifices 211o into e.g. the motor assembly 100.

When the magnets 211m are in place within the orifices 211o, a retainer washer 211w is positioned over the top of the magnets 211m. The retainer washer 211w is configured to fit within the annular recess 214r so that the washer 211w may lie flat against the upper ends of the magnets 211m to hold them in position, and to constrain the magnets 211m against loosening, or rattling, for example. The retainer washer 211w is fixed in position to secure it against the inner surface of the annular recess 214r. For example, the retainer washer 211w can be spot welded in place to enhance the constraint of the magnets 211m and to restrict movement of the retainer washer 211w. The retainer washer 211w and the end plate 214 are made from non-ferrous material to avoid interfering with the activity of the magnets 211m.

At an end of the input shaft 212 (i.e. the end that is not being inserted into the central aperture 214a of the end plate 214) is a flange 219. The smallest diameter central axially arranged sun gear 223 is mounted on the opposite side of the flange 219 to the input shaft 212. The flange 219 comprises orifices 219o which are symmetrically arranged around the flange 219, in such a way that they are aligned with the orifices 211o in the end plate 214 when the input shaft 212 is inserted into the central aperture 214a of the end plate 214. The orifices 219o receive cylindrical magnets 219m, which are inserted into the orifices 219o, best seen in FIG. 10a. Optionally the orifices 219o comprise through holes at the opposite end of each orifice 219o to the end in which the magnets 219m are inserted, but the through-holes are of a smaller dimension, e.g. a smaller diameter, than the magnets 219m. The magnets 219m are thus prevented from passing through the other end of the orifices 219o into e.g. the inner gear assembly 210.

When the magnets 219m are in place within the orifices 219o of the flange 219, a retainer washer 219w is placed over the magnets 219m to constrain their movement and hold them in place within the orifices 219o. The retainer washer 219w and flange 219 are made from non-ferrous material to avoid interfering with the activity of the magnets 219m. As the orifices 211o in the end plate 214 and the orifices 219o in the flange 219 are arranged to be aligned, the magnets 211m, 219m also align when the input shaft 212 is inserted into the central aperture 214a of the end plate 214. The groups of magnets 211m, 219m are positioned at the same distance away from the central axis of the setting tool assembly 1 in the end plate 214 and in the flange 219 so that the magnets 211m, 219m align longitudinally.

The three magnets in each of the groups 211m may be arranged so that their north and south poles are all aligned and facing the same way—for example, all of the magnets' 211m south poles may be facing in the direction of the motor 104 and the north poles may be facing in the direction of the flange 219 or vice versa. Alternatively, the three magnets making up each group 211m may be aligned in alternating directions, e.g. N-S-N or S-N-S. The groups of magnets 219m arranged in the flange 219 are, accordingly, arranged in the complementary configuration to the magnets 211m in the end plate 214 in order to ensure a magnetic attractive force is in place between the magnets 211m in the end housing 214 and the magnets 219m in the flange 219. This force resists rotational displacement of the flange 219 relative to the end plate 214, meaning that an additional force must be overcome by the electric motor 104 before rotation of the gears may commence. The addition of the magnetic brake is useful in resisting backwinding of the gear assembly 210.

The inner gear assembly 210 is in summary arranged to step down the rotation of the DC electrical motor 104 from approximately 5000 RPM when the electrical motor 104 is running at top speed, down to whatever speed is required to be output by the output coupling 220 of the inner gear assembly 210. As an example, the output speed of the output coupling 220 could be in the region of 3.5 RPM. Consequently, the inner gear assembly 210 will step up the very low level of torque output by the output coupling 114 of the DC motor 104 to a relatively high level of torque by a similar ratio to the step down in the speed as outlined above.

The addition of the magnets 211m, 219m creates a magnetic brake that acts in addition to the braking effect of the short circuit in the motor 104. The magnetic force between the magnets 211m, 219m further resists unwanted reverse rotation, but at the same time does not present a significant obstacle to rotation of the gears when desired, i.e., when the motor 104 is actuated.

The magnets 211m, 219m are positioned on the end plate 214, as this is where least work is required to brake the system due to the gear ratio; for example, a 3000:1 gear ratio may be used which would then require the magnetic force to be 3000 times greater at the gear output side, than the present arrangement of having the magnets positioned at the gear input side. The motor 104 can easily overcome the magnetic attraction between the magnets 211m, 219m at the gear input side, but the hydrostatic pressure acting on the end of the inner gear assembly 210 has to step down e.g. 3000:1 and therefore cannot overcome the magnetic force.

The inner gear assembly 210 provides the step down in speed/step up in torque by means of a suitable number of gear stages. In the preferred example of the multi-stage epicyclic inner gear assembly 210 described herein, there are five gear stages as best seen in FIG. 8a, these being:

Stage 1—indicated with reference numeral 222, and which comprises, relatively speaking with reference to the other stages, the smallest diameter central axially arranged sun gear 223 and the largest diameter axial planetary gears 224, where the stage 1 222 planetary gears 224 are mounted on dowel axles 225 provided on a first plate 226 such that the first stage planetary gears 224 can rotate about the stage 1 axles 225 with respect to the first plate 226;

Stage 2—indicated with reference numeral 232 comprises a central (next largest) diameter axially arranged sun gear 233 and which is in geared contact with (next smallest) diameter axially arranged planetary gears 234 which are arranged in an orbit around the sun gear 233 and which are rotationally mounted on dowels 235 which act as axles for the planetary gears 234, where the dowel axles 235 are secured within and project axially away from a second plate 236.

Importantly, the second stage axially arranged sun gear 233 comprises an integral axle portion 233 AP and which is keyed or locked into a central bore of the first plate 226 of stage 1 222, such that rotation of the first plate 226 inevitably causes rotation at the same speed of the next largest diameter axially sun gear 233 of stage 2.

Stage 3—indicated with reference numeral 242 comprises a next largest diameter axially arranged sun gear 243 and which comprises its own axle portion 243 AP which is keyed or otherwise locked to the second plate 236 and thus rotates with the second plate 236. The next smallest axially arranged sun gear 243 is coupled via respective gear teeth to an arrangement of next smallest diameter axially arranged planetary gears 244 which are arranged in an orbit around the sun gear 243. The planetary gears 244 are rotationally mounted on dowel axles 245 which are secured to a third plate 246 which in turn is locked or otherwise secured to the next largest diameter axial arranged sun gear axle portion 253 AP of the stage 4 axial sun gear 253.

Stage 4—indicated with reference numeral 252 comprises the next largest diameter axially arranged sun gear 253 and which is in geared connection with the gear teeth of an arrangement of next smallest diameter axially arranged planetary gears 254 which are arranged in an orbit around the sun gear 253 and which in turn are mounted rotationally on dowels 255 which act as axles for said planetary gears 254, where the dowel axles 255 are secured to a fourth plate 256. The fourth plate is itself integrally formed with the largest diameter axially sun gear 263 as shown in FIG. 8c of the fifth stage 262 of the inner gear assembly 210. Thus, rotation of the axially sun gear 253 of stage 4 252 results in rotation of the planetary gears 254 in an orbit around the sun gear 253 and which causes rotation around the longitudinal axis of the inner gear assembly 210 of the dowels 255 and thus the plate 256.

Stage 5—indicated with reference numeral 262 of the inner gear assembly 210 comprises the largest diameter axially arranged sun gear 263 as having gear teeth provided along its outer cylindrical surface and which engage with the smallest diameter axially arranged planetary gears 264 which are arranged in an orbit around the sun gear 263 and which in turn are mounted upon a respective dowel axle 265 and which in turn is secured to the plate 266 for the fifth stage 262. The plate 266 is integral with output shaft 267 which in turn is coupled via longitudinally arranged splines to output coupling 220 thus ensuring that any rotation of the output shaft 267 simultaneously causes equal rotation of the output coupling 220.

As shown in FIG. 8c, the inner gear assembly 210 is entirely located within the bore of gear housing 302 and in this preferred embodiment of gear box assembly 300, in accordance with the fourth aspect of the present invention, the gear housing 302 itself comprises an arrangement of inner gear teeth 308 arranged longitudinally along the length of the inner throughbore 310 of the gear box housing 302 without the need for a separate component like the first embodiment of the gear box sub-assembly 200. Thus, the radially outermost teeth of the planetary gears of each of stages 1,2,3,4 and 5 (with respect to the longitudinal axis X-X of the inner gear assembly 210) are in contact with the inner gear teeth 308 and thus the inner surface of the inner throughbore 310 of the gear box housing 302 is acting like a ring gear and thus causes the planetary gears 224, 234, 244, 254, 264 to rotate about their respective dowel axle 225, 235, 245, 255, 265 as they orbit their respective sun gear 223, 233, 243, 253, 263.

Accordingly, relatively fast rotation of the input shaft 212 is stepped down through stages 1 (222), stage 2 (232), stage 3 (242), stage 4 (252) and stage 5 (262) to result in much slower rotation of the output coupling 220 but with a consequent significant increase in the torque being achieved through each stage.

The output shaft 267 is supported by a pair of taper roller bearings 268 arranged in series and which are held in place by shim washers 270 and a circlip 269.

Additionally and advantageously, each stage of the inner gear assembly 210 is in direct contact with the next stage by means of a dimple point to point contact being provided on each upper and each lower face of each sun gear (223,233, 243, 253, 263) where the dimple on the upper end (left hand end as shown in FIG. 8c) for each sun gear 223,233, 243, 253, 263 is referred to as UD following the reference number for the respective sun gear 223,233, 243, 253, 263 and the lower in use dimple is referred to as LD following the reference number for the respective sun gear 223,233, 243, 253, 263. The upper dimple 233 UD and lower dimple 233 LD for the sun gear 233 of the second stage 232 are shown in much greater detail in FIG. 8e as being in respective contact with the lower dimple 233 LD and the upper dimple 243 UD of the respective first stage sun gear 223 and third stage sun gear 243. The dimples UD, LD are arranged such that they project further axially outwards than the rest of the face of the respective sun gear 223,233, 243, 253, 263 and thus the rest of the upper and lower faces of the respective sun gears 223,233, 243, 253, 263 are spaced away from the next closest face of the adjacent sun gear 223,233, 243, 253, 263 but the dimples UD, LD (for example dimple 233 LD) is/are arranged to be in touching contact with the closest adjacent dimple (for example 243 UD) all the way along the longitudinal axis X-X of the inner gear assembly 210 such that the dimples UD, LD form a continuous spine along the length of the inner gear assembly 210. Accordingly, the dimples UD, LD provide the great advantage that any shocks or vibrations that occur to the inner gear assembly 210 are transmitted along the spine of the sun gears 223,233, 243, 253, 263 and the dimples UD, LD thereof and thus such forces or vibrations do not act to rattle or pull apart the components of the inner gear assembly 210. Furthermore, because the dimples UD, LD have a contact surface area with one another which is a much smaller surface area than would be the case if the entire diameters of the sun gears 223,233, 243, 253, 263 were in contact with one another, it means that there is much lower friction occurring when the sun gears 223,233, 243, 253, 263 rotate at different speeds relative to one another. The dimples UD, LD are preferably convex in shape and optionally the radius of the raised convex dimple UD, LD is substantially constant around the whole dimple UD, LD (although in another embodiment—not shown—the dimples UD, LD comprise a slightly flattened section such that the dimples UD, LD contact each other at the slightly flattened section relative to the radius of the dimple UD, LD). The sun gears 223,233, 243, 253, 263 are all preferably formed of metal and thus the point contact between all of the sun gears 223, 233, 243, 253, 263 creates a fully metal load path up the "spine" of all of the sun gears 223,233, 243, 253, 263 which assists in avoiding damage to the inner gear assembly 210 should the operator require to jar the bottom hole assembly (BHA) within which the setting tool assembly 1 is included because the direct method coupling between each of the dimples UD, LD of the sun gears do not dampen the load path.

FIG. 8f shows another example of dimples 233LDa, 233UDa with a shallow radius and a single contact point between them. Only two dimples are illustrated in order to provide a sufficiently close-up view but the skilled person will understand that the dimples along the "spine" of the sun gears 223, 233, 243, 253, 263 may similarly be formed with such an exemplary radius as an alternative to the dimples shown in FIG. 8e.

Output coupling 210 is arranged to be rotationally splined and in constant connection with the upper end 404U of an input shaft 404 of the linear drive assembly 400 but it should be noted that other assemblies other than the linear drive assembly 400 could be attached to the output shaft 267 and output coupling 220 of the inner gear assembly 210 depending upon the requirements of the operator.

Linear Drive Assembly 400

When an operator requires a potentially large linear force delivered downhole to operate for example a downhole plug (not shown) or sliding sleeve (not shown) or circulation tool (not shown) etc., the operator can include a linear drive assembly 400 into the setting tool assembly 1, where the linear drive assembly 400 comprises an outer housing 401 which is connected at its upper end via suitable connection means such as a screw threaded connection 403U to the lower end 209; 309 of the gear box sub-assembly 200; 300. The housing 401 contains within its throughbore 407 a ball or lead screw 404, where the upper end of the ball screw 404u is rotationally coupled to the output coupling 220 of the inner gear assembly 210 and thus any rotation of the output coupling 220 results in simultaneous rotation of the ball screw 404 at exactly the same speed of rotation as the output coupling 220. The ball screw 404 has a helical profile or screw thread profile 430 formed along the majority of the axially length of the outer circumference thereof and a ball nut 405 is arranged like a sleeve around the outer surface of the ball screw 404. The inner throughbore 432 of the ball nut 405 is also provided with a helical or screw thread profile 433 along its entire inner throughbore 432 and is preferably arranged to permit a plurality of ball bearings 434 to be located all along the helical gap between the two helical profiles 430, 433 such that the ball bearings 434 are trapped within the length of the helical gap between the two helical profiles 430, 433. Accordingly, a very low level of friction is encountered when the lead screw 404 rotates within the ball nut 405. Alternatively, the ball nut 405 could be provided with a complimentary screw thread formed on its inner throughbore 432 to compliment the screw thread 430 provided on the ball screw 404 and thus the ball bearings 434 would not be required. The ball nut 405 is provided with an aperture 421 formed through its side wall and through which the ball bearings 434 may be inserted in order to locate them within the helical gap and a plug 422 may be inserted into the aperture 421 to prevent the ball bearings 434 from escaping.

At least one and preferably two keyways 408 is/are preferably formed along the longitudinal length of at least a portion of the inner throughbore 407 of the housing 401 and a complimentary key 406 is typically securely mounted within a suitable slot formed on the outer circumference of the ball nut 405, where the key 406 is arranged to also be slidably located within the keyway 408, such that the interaction between the key 406 and the keyway 408 prevents rotation occurring between the ball nut 405 and the housing 401. Thus, the ball nut 405 is rotationally locked with respect to the housing 401. Consequently, rotation of the input shaft 402 and thus the ball screw 404 with respect to the housing 401 will result in longitudinal axial movement of the ball nut 405 and thus the ball nut 405 will move from the fully stroked out configuration shown in FIG. 11*c* from right to left such that the ball nut 405 will move toward the upper end (left-hand end) of the housing 401.

A slick rod 410 is securely mounted to the lower end (right-hand end) of the ball nut 405 via suitable connection means such as screw threaded connection 411. An outer adapter 416 is securely mounted to the lower end of the housing 401 via suitable connection means such as a screw threaded connection 403L. Furthermore, suitable seals such as O-ring seals 418 are provided between the housing 401 and the outer adapter 416 in order to prevent downhole fluids from leaking past the O-ring seals 418. The outer adapter 416 envelops the outer surface of the majority of the length of the slick rod 410 like a sleeve and a suitable seal such as a packing seal 419 acts between the inner surface of the outer adapter 416 and the outer surface of the slick rod 410 in order to prevent downhole fluids from passing said packing seal 419.

The slick rod 410 comprises a central bore 412 and as shown in FIG. 11*c* and FIG. 11*d*, the ball screw 404 is arranged such that rotation of the ball screw 404 results in longitudinal movement from right to left of the ball nut 405 and thus the slick rod 410 such that the ball screw 404 will be swallowed by the central bore 412 of the slick rod 410 and thus the slick rod 410 is stroked in such that the overall longitudinal length of the linear drive assembly 400 shortens.

An attachment profile 414 is provided at the lower (right-hand) end of the slick rod 410 and any downhole tool which requires longitudinal axial movement to be actuated can be attached to the attachment profile 414.

A rotary thrust bearing 420 is provided at the upper end (left-hand end) of the housing 401 within the throughbore 407, where the rotary thrust bearing 420 is secured to the inner surface of the housing 401 and permits the upper end 404U of the ball screw 404 to rotate within the rotary thrust bearing 420 and thus the rotary thrust bearing 420 supports the upper end of the lead screw 404 and ensures that the central long axis of the lead screw 404 is maintained always on the longitudinal axis X-X of the linear drive assembly 400 whilst allowing the ball screw 404 to rotate around that longitudinal axis X-X.

The linear drive assembly 400 has significant advantages over conventional linear drive assemblies in that the linear drive assembly 400 in accordance with the present invention is much more compact (short) in terms of longitudinal length than conventional linear drive assemblies because the slick rod 410 is located around the outer surface of the ball screw 404 and more over swallows the ball screw 404 when the slick rod 410 is stroked in. Consequently, the linear drive assembly 400 is around half the length of conventional linear drive assemblies and thus results in a much more compact downhole tool and this provides significant technical and commercial advantages over conventional linear drive assemblies. The setting tool assembly 1 is also likely to require much lower maintenance and also is likely be significantly lower cost when compared with conventional downhole linear drive assemblies.

It should also be noted that with embodiments of the present invention, the operator has the yet further advantage that they can decide if desirable to instruct the PCB 24 to reverse the polarity of the electrical supply from the battery pack 22 to the electrical motor 104 such that the motor 104 can be operated in the reverse direction to push the slick rod outwardly such that is it stroked outwards and thus the setting tool assembly 1 can be used to actuate a tool (not shown) that is actuated by being "pushed" rather than pulled or the setting tool assembly 1 can be reset whilst downhole for another downhole setting operation without having to be pulled out of the wellbore to be reset.

Modifications improvements may be made to the embodiments here and before described without departing from the scope of the invention as defined by the claims.

The invention claimed is:

1. A downhole power control module for use in a downhole tool and adapted to be run downhole with the downhole tool and provide power to the downhole tool, the power control module comprising:—
    a housing;
    a battery pack; and
    an electronic control circuit for controlling operation of at least the battery pack; and
    a positive electric output terminal and a negative electric output terminal for supplying electric power from the battery pack to a respective positive electric input terminal and a respective negative electric input terminal provided in the downhole tool;
    wherein the power control module is mountable to the downhole tool such that the positive electric output terminal of the power control module is in electrical communication with the positive electric input terminal of the downhole tool and the negative electric output terminal of the power control module is in electrical communication with the negative electric input terminal of the downhole tool;
    and wherein the power control module is removable from the downhole tool such that the positive electric output terminal of the power control module is not in electrical communication with the positive electric input terminal of the downhole tool and the negative electric output terminal of the power control module is not in electrical communication with the negative electric input terminal of the downhole tool;
    characterised by a switch comprising two electrical couplings provided between said respective positive and negative electrical terminals of the power control module and the downhole tool;
        the said two electrical couplings of the switch further comprising:—
            two plugs provided on one of the power control module and the downhole tool; and
            two sockets provided in the other of the power control module and the downhole tool;
        and wherein the switch is arranged:—
            to open when the power control module is removed from the downhole tool and the two plugs are arranged to disengage from the respective two sockets to remove a short circuit between the two plugs and the respective two sockets such that the battery pack is isolated from the electronic control circuit to preserve charge in the battery pack;
            and is further arranged to close when the power control module is mounted to the downhole tool and the two plugs are arranged to engage with and make an electrical coupling with the two sockets and furthermore the two plugs and the two sockets are electrically coupled to one another such that they short circuit when the power control module and thus the battery pack is mounted to the downhole tool such that the battery pack is permitted to provide power to the electronic control circuit; and wherein the housing is configured to contain the battery pack and electronic control circuit such that the battery pack and electronic control circuit are mountable to and removable from the downhole tool as a single unit.

2. The power control module of claim 1, wherein the electronic control circuit requires power from the battery pack to operate and further controls operation of the battery pack in supplying electrical power to the downhole tool.

3. The power control module of claim 1, wherein the electronic control circuit is configured to receive signals via e-line from the surface of the wellbore into which the downhole tool is run.

4. The power control module of claim 1, wherein the downhole tool further comprises an electrical motor and the electronic control circuit controls the operation of the battery pack in selectively supplying electrical power to the electrical motor in order to selectively operate the electrical motor.

5. The power control module of claim 4, wherein the switch is provided in a separate switch module removable from the power control module and/or the electrical motor.

6. The power control module of claim 5, wherein the switch module comprises one or more additional switches such as a mechanical pressure switch or a temperature switch.

7. The power control module of claim 4, wherein the switch comprises one or more components of the electrical motor engaging with one or more components of the power control module.

8. The power control module of claim 1, wherein the switch comprises closing an electrical circuit to permit electricity to flow from the battery pack to the electronic control circuit.

9. The power control module of claim 1, wherein the switch is located in between and is in electrical communication with the battery pack and the electronic control circuit such that when the switch is closed, electricity flows from the battery pack to the electronic control circuit to power the electronic control circuit.

10. The power control module of claim 1, wherein the electronic control circuit comprises a Printed Circuit Board (PCB) mounted within the power control module.

* * * * *